(12) United States Patent
Suzuki

(10) Patent No.: US 12,535,976 B2
(45) Date of Patent: Jan. 27, 2026

(54) INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Shinya Suzuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/856,828

(22) Filed: Jul. 1, 2022

(65) Prior Publication Data

US 2023/0008087 A1    Jan. 12, 2023

(30) Foreign Application Priority Data

Jul. 6, 2021 (JP) .................................. 2021-112140
Apr. 22, 2022 (JP) .................................. 2022-070534

(51) Int. Cl.
*G06F 3/12* (2006.01)

(52) U.S. Cl.
CPC .......... *G06F 3/1225* (2013.01); *G06F 3/1205* (2013.01); *G06F 3/1258* (2013.01)

(58) Field of Classification Search
CPC .... G06F 3/1225; G06F 3/1205; G06F 3/1258; G06F 3/1285
See application file for complete search history.

(56) References Cited

U.S. PATENT DOCUMENTS

| | | | | |
|---|---|---|---|---|
| 10,162,584 B1 * | 12/2018 | Ozawa | ................... | G06F 3/1231 |
| 2002/0054339 A1 * | 5/2002 | Arakawa | ............ | H04N 1/32464 |
| | | | | 358/1.15 |
| 2002/0075344 A1 * | 6/2002 | Usui | .................... | B41J 2/17546 |
| | | | | 347/19 |
| 2002/0101600 A1 * | 8/2002 | Sabbagh | ................. | G06F 3/126 |
| | | | | 358/1.13 |
| 2003/0040984 A1 * | 2/2003 | Inami | ................... | G06Q 10/087 |
| | | | | 705/26.82 |
| 2004/0186925 A1 * | 9/2004 | Cooper | ............. | G06K 15/1859 |
| | | | | 710/8 |
| 2005/0073717 A1 * | 4/2005 | Arakawa | ............... | G06F 3/1288 |
| | | | | 358/1.15 |
| 2007/0165248 A1 * | 7/2007 | Utsunomiya | ......... | G06F 3/1208 |
| | | | | 358/1.1 |

(Continued)

FOREIGN PATENT DOCUMENTS

| | | | | |
|---|---|---|---|---|
| EP | 2490119 A2 * | 8/2012 | .......... | G06F 3/1204 |
| JP | 2020004158 A | 1/2020 | | |

*Primary Examiner* — Huo Long Chen
(74) *Attorney, Agent, or Firm* — Canon U.S.A., Inc. IP Division

(57) ABSTRACT

An information processing apparatus includes a first printer driver configured to generate first print data to be transmitted to an image forming apparatus according to a predetermined protocol and a second printer driver configured to generate second print data to be transmitted to a server system according to the predetermined protocol. The information processing apparatus further includes a display unit configured to display a first screen in a case where first information for transmitting the first print data is selected, and to display a second screen in a case where second information for transmitting the second print data is selected, and a transmission unit configured to transmit the first print data or the second print data.

22 Claims, 19 Drawing Sheets

(56) References Cited

U.S. PATENT DOCUMENTS

| | | | | |
|---|---|---|---|---|
| 2009/0290193 A1* | 11/2009 | Ohba | ............... | G06F 3/1287 |
| | | | | 358/1.15 |
| 2011/0188065 A1* | 8/2011 | Hadano | ............... | G06F 3/12 |
| | | | | 358/1.13 |
| 2012/0092689 A1* | 4/2012 | Ito | ............... | G06F 3/1288 |
| | | | | 358/1.13 |
| 2014/0293312 A1* | 10/2014 | Fukasawa | ............... | G06F 3/1255 |
| | | | | 358/1.15 |
| 2016/0154614 A1* | 6/2016 | Saito | ............... | H04N 1/00456 |
| | | | | 358/1.9 |
| 2016/0342577 A1* | 11/2016 | Ando | ............... | H04N 1/00244 |
| 2020/0004473 A1* | 1/2020 | Saigusa | ............... | G06F 3/1225 |

\* cited by examiner

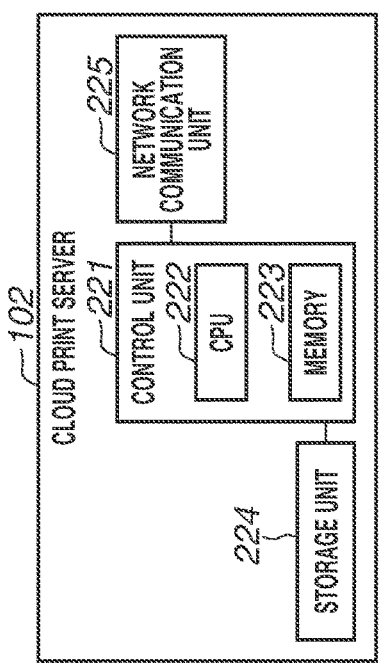
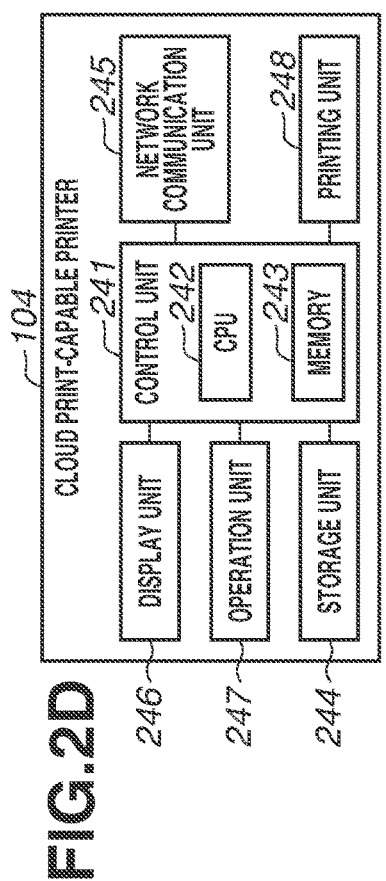
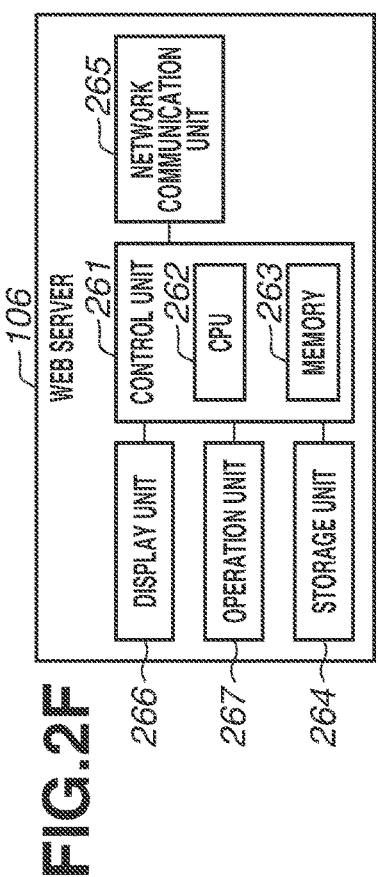
FIG.2A  FIG.2B  FIG.2C  FIG.2D  FIG.2E  FIG.2F

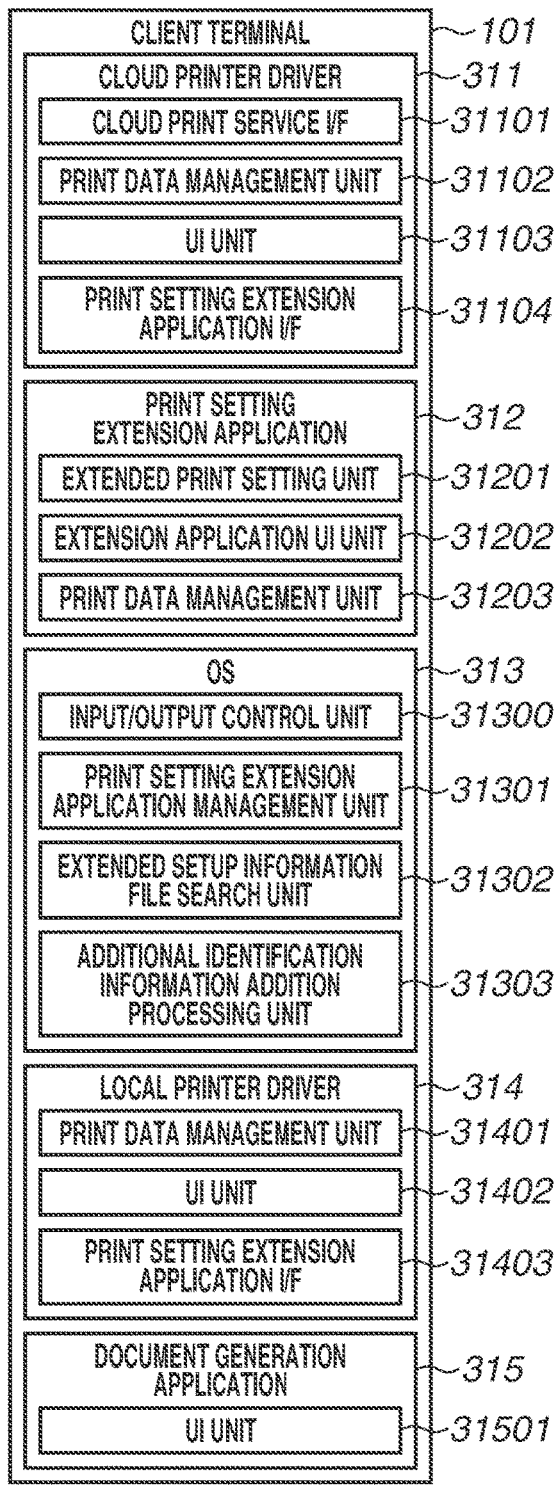
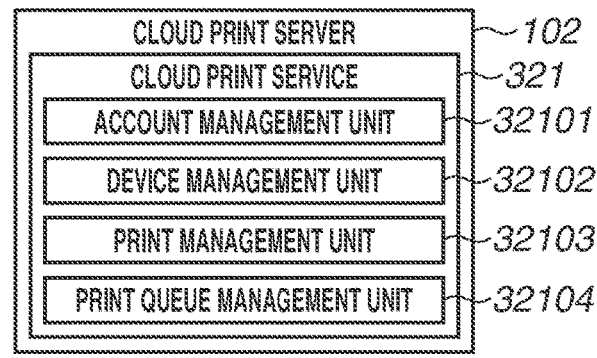
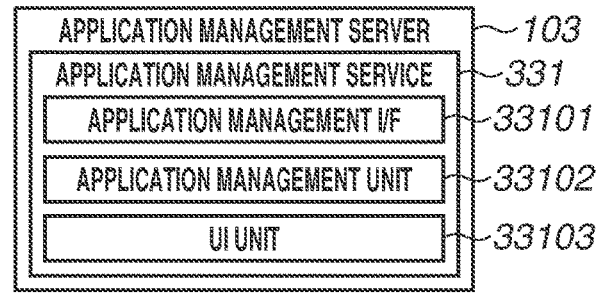
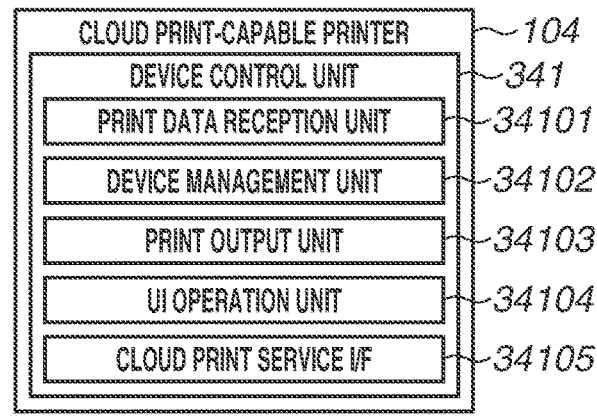

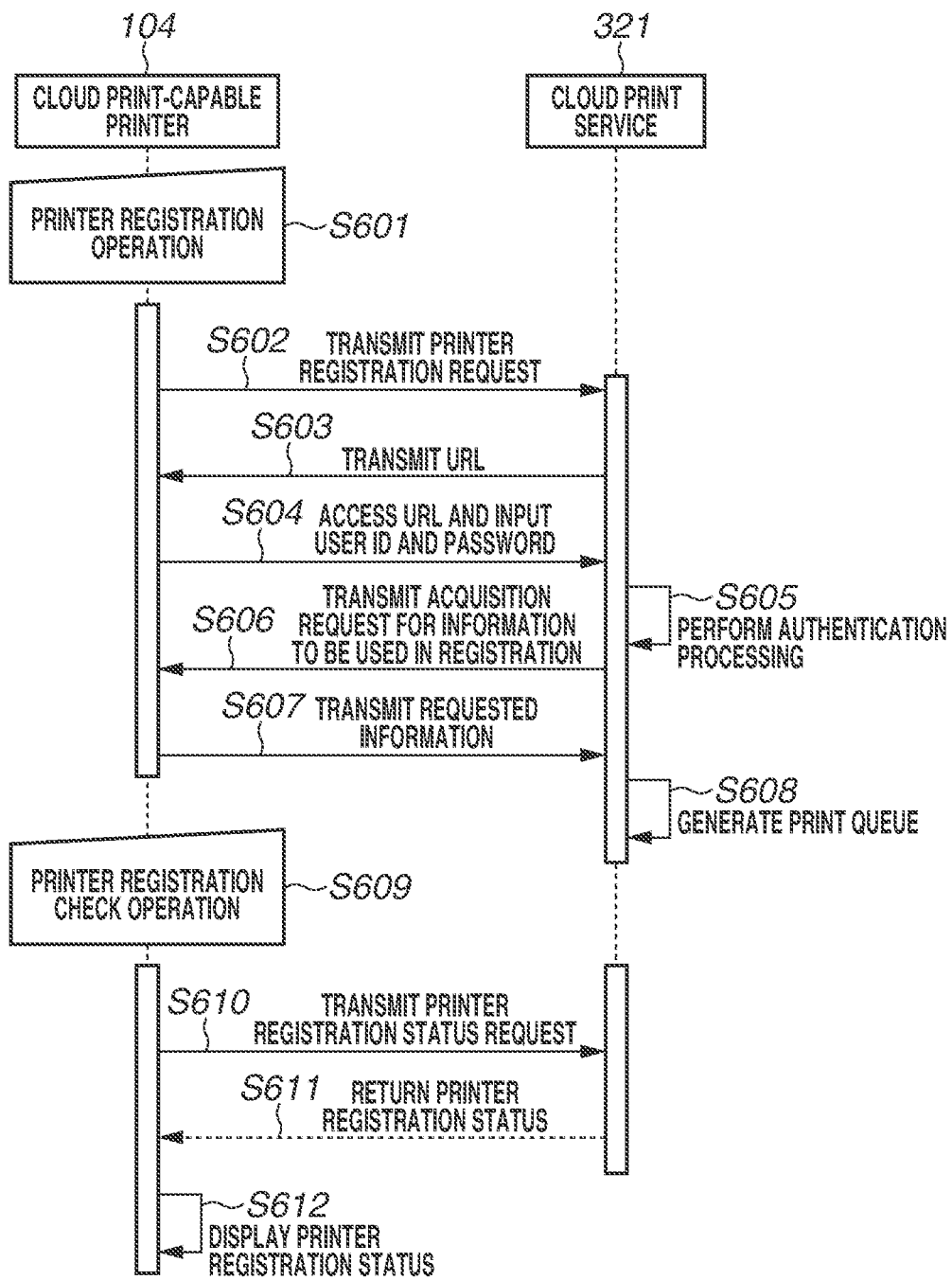

| PAPER SIZE | POSTCARD ▼ |
| COPIES | 1 |
| ORIENTATION | PORTRAIT ▼ |
| PRINT STYLE | ONE-SIDED PRINTING ▼ |

| PAPER SIZE | POSTCARD ▼ |
| COPIES | 1 |
| ORIENTATION | PORTRAIT ▼ |
| PRINT STYLE | ONE-SIDED PRINTING ▼ |
| STAPLING | ON |
| PUNCHING | OFF |

- 940 — PRINT
- 941 — Printer-A ▼
- 943 — COPIES 1
- 942 — ADDITIONAL SETTINGS

PREVIEW

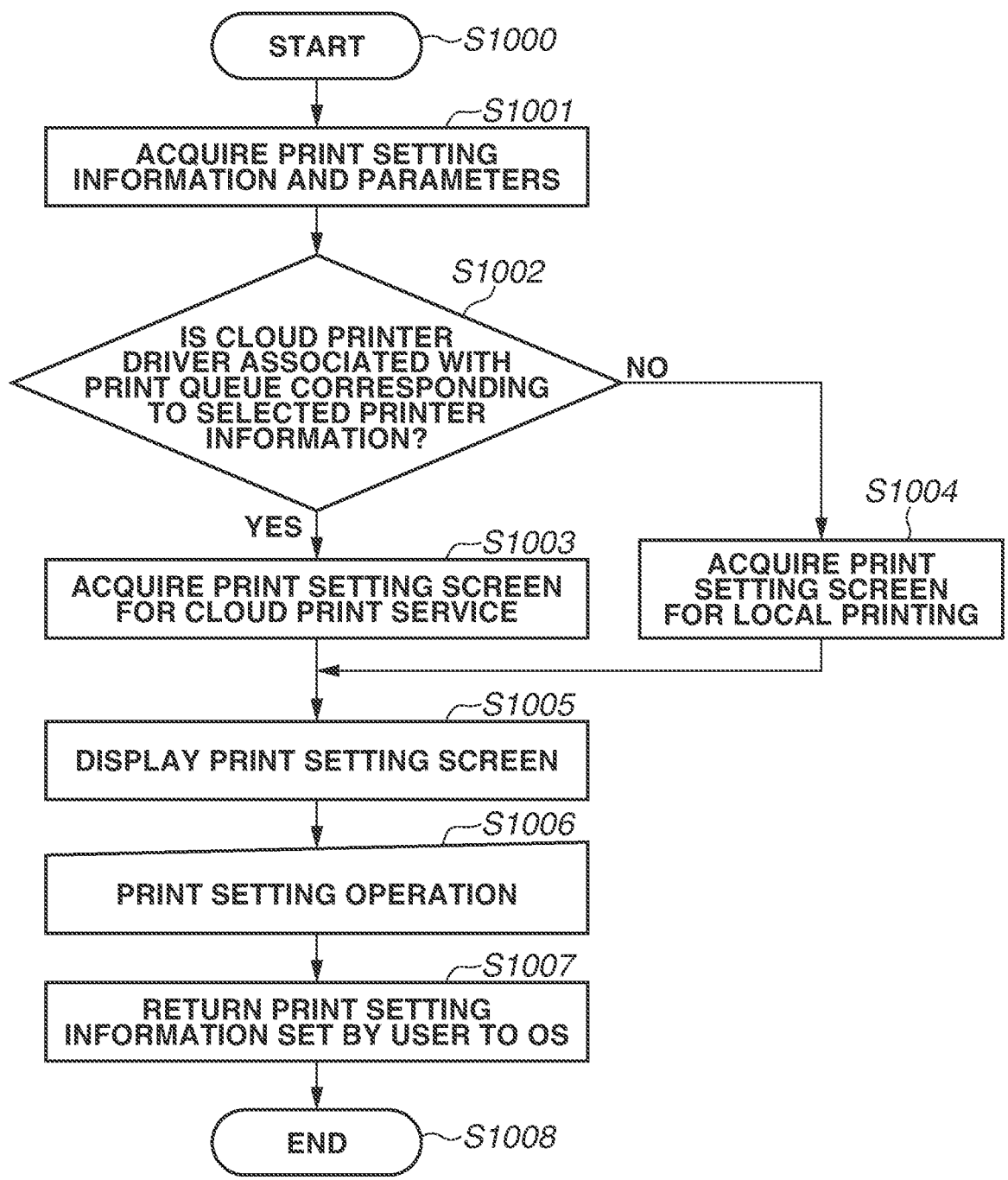

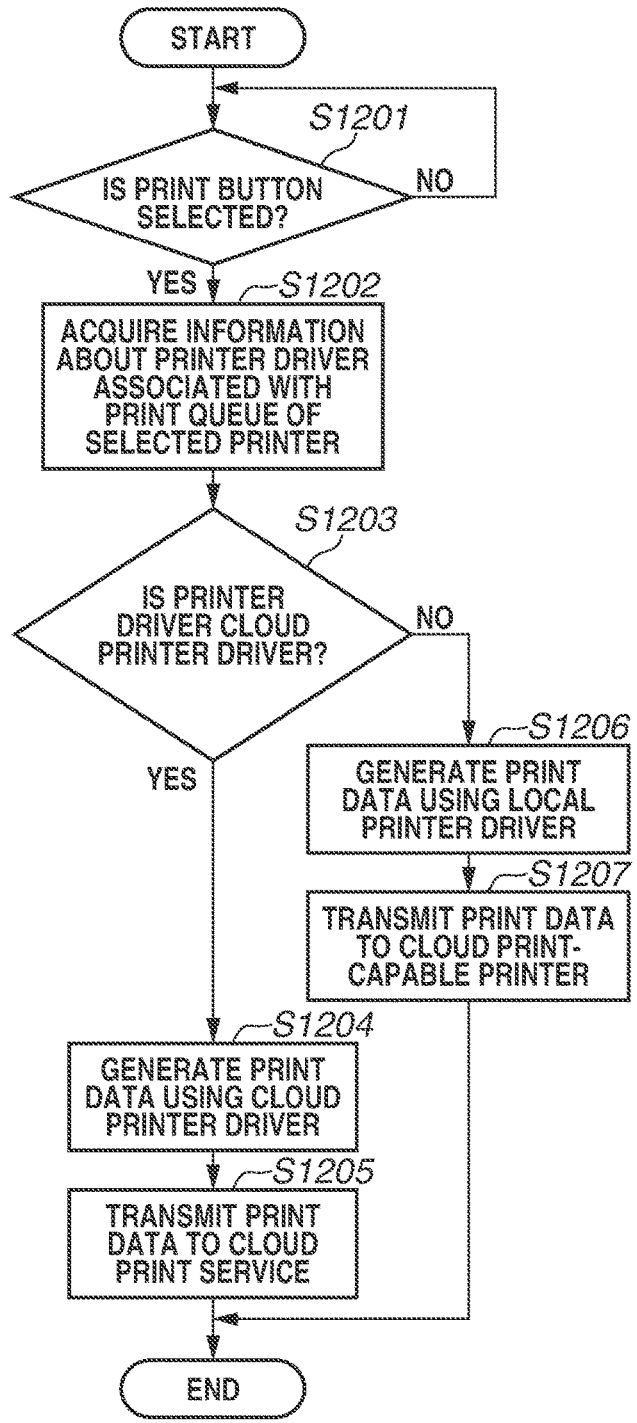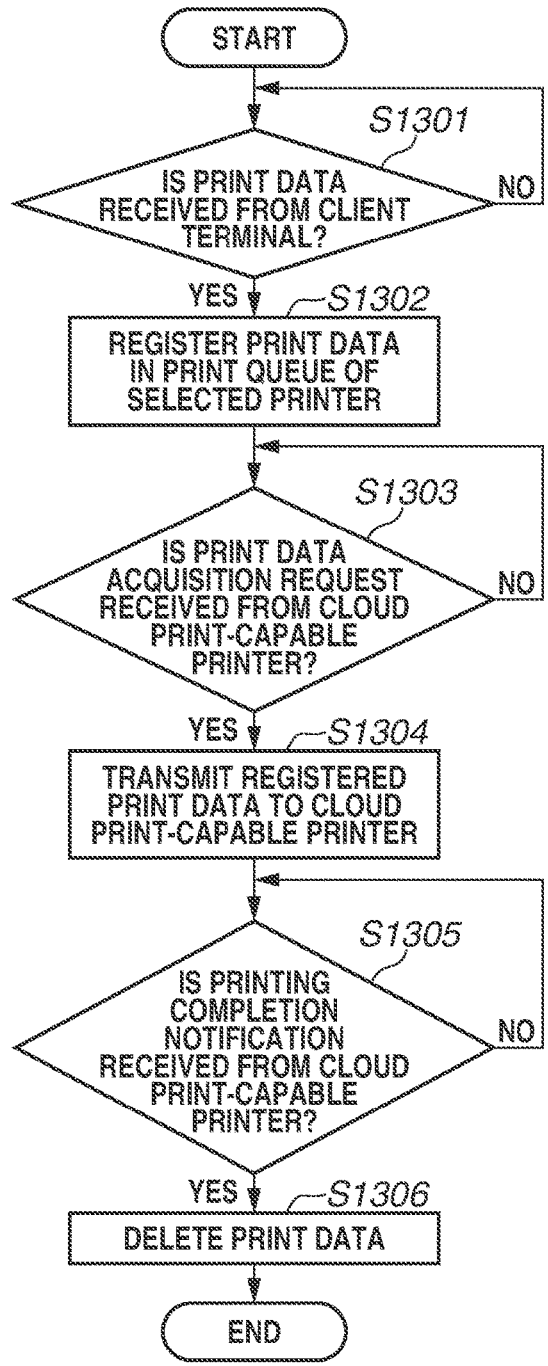

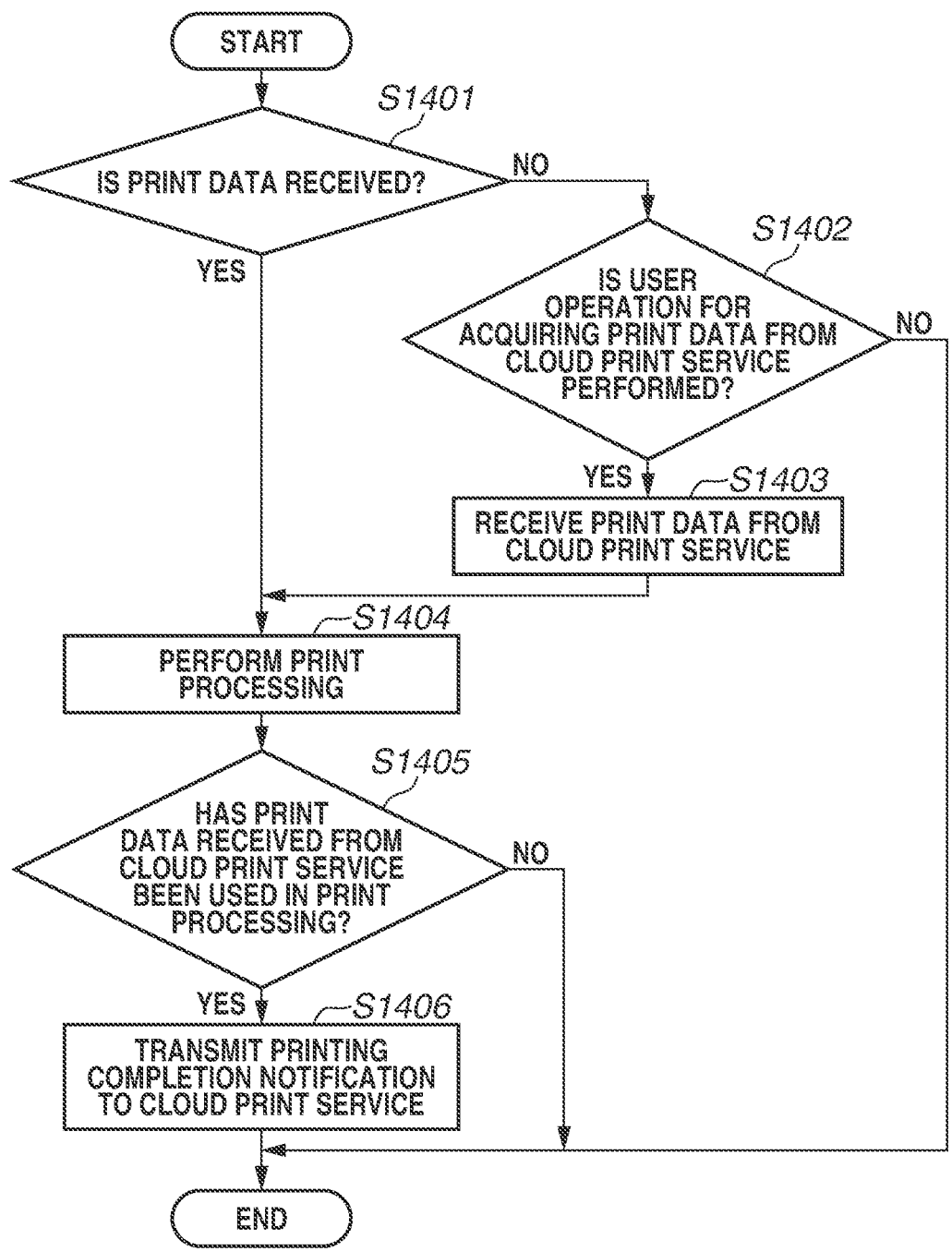

| PAPER SIZE | POSTCARD ▼ |
|---|---|
| COPIES | 1 |
| ORIENTATION | PORTRAIT ▼ |
| PRINT STYLE | ONE-SIDED PRINTING ▼ |
| PIN PRINT | |

| PAPER SIZE | POSTCARD ▼ |
|---|---|
| COPIES | 1 |
| ORIENTATION | PORTRAIT ▼ |
| PRINT STYLE | ONE-SIDED PRINTING ▼ |
| STAPLING | ON |
| PUNCHING | OFF |

OK

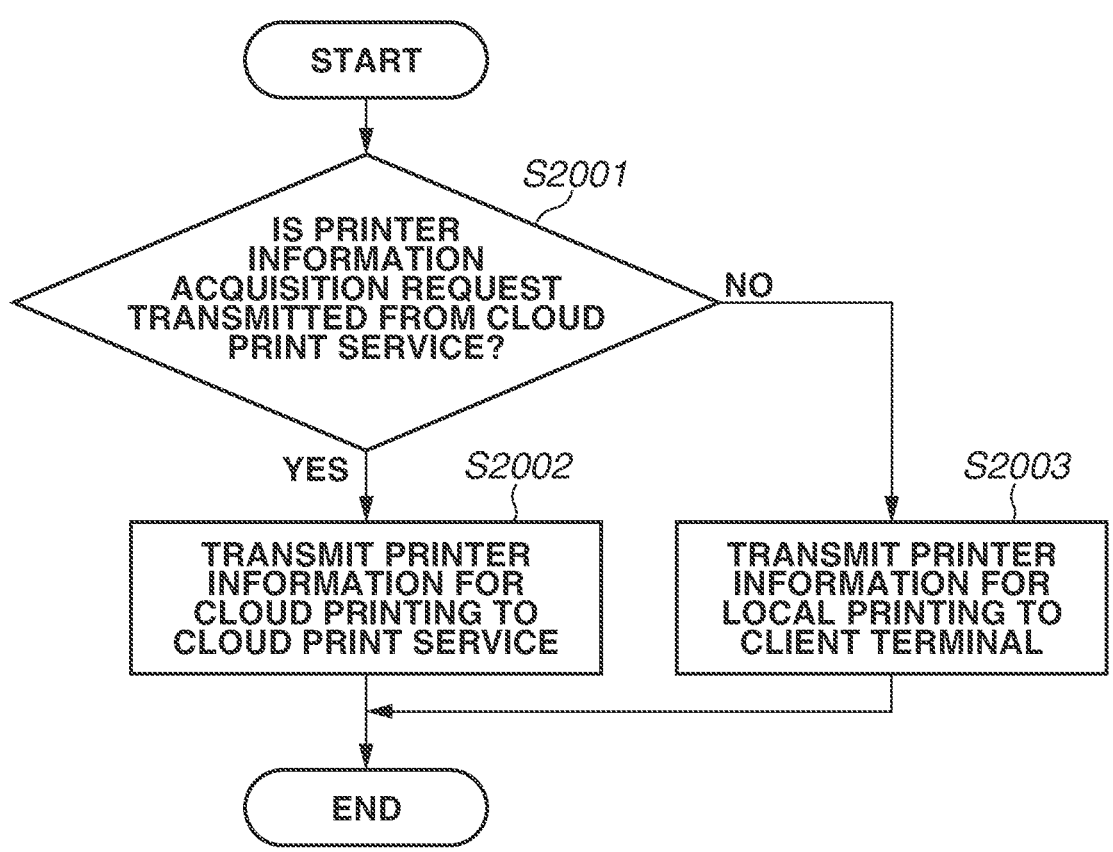

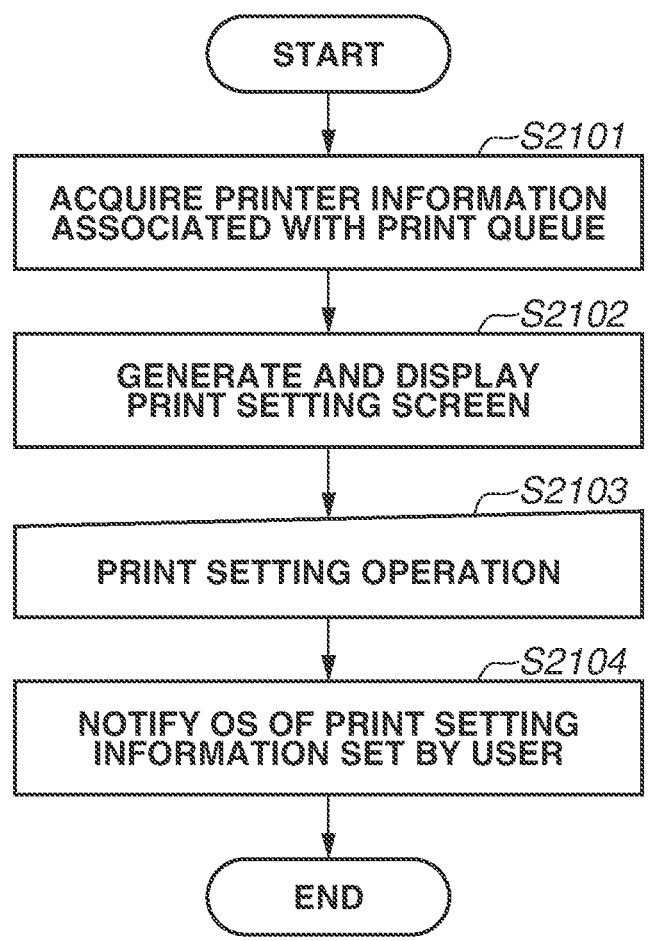

| SETTING ITEM | LOCAL PRINTER DRIVER | CLOUD PRINTER DRIVER |
|---|---|---|
| PAPER SIZE | YES | YES |
| COPIES | YES | YES |
| ORIENTATION | YES | YES |
| PRINT STYLE | YES | YES |
| PUNCHING | NO | YES |
| STAPLING | NO | YES |
| PIN PRINT | YES | NO |

INFORMATION PROCESSING APPARATUS, METHOD FOR CONTROLLING THE SAME, AND STORAGE MEDIUM

BACKGROUND

Technical Field

The aspect of the embodiments relates to an information processing apparatus, a method for controlling the information processing apparatus, and a storage medium.

Description of the Related Art

A general-purpose printer driver (a local printer driver) that communicates directly with an image forming apparatus using an industry-standard protocol such as the Internet Printing Protocol (IPP) has recently been discussed. The local printer driver can communicate with image forming apparatuses of a plurality of printer vendors and various models of image forming apparatuses. Thus, using the local printer driver enables the user to transmit print data to an image forming apparatus without installing a vendor-specific printer driver.

Printing using a cloud print service has also been discussed. In using the cloud print service, a printer driver (a cloud printer driver) for the cloud print service is installed onto an information processing apparatus. The information processing apparatus then transmits print data to the cloud print service using the cloud printer driver, and the cloud print service transmits the print data to an image forming apparatus to perform printing.

The above-described local printer driver and cloud printer driver are assumed to generate the print data to be printed by image forming apparatuses of various vendors and different models of image forming apparatuses. Thus, setting items settable on a print setting screen to be displayed by the local printer driver or the cloud printer driver are limited to some setting items that image forming apparatuses of any vendor have.

To address the issue, as discussed in Japanese Patent Application Laid-Open No. 2020-04158, a print setting extension application for extending a print setting screen so as to be suitable for an image forming apparatus used for printing by using identification information about the image forming apparatus associated with a printer driver is installed. The installation of the print setting extension application enables the user to set setting items and setting values unique to the printer vendor in addition to the items settable by the local printer driver and the cloud printer driver.

Identification information for identifying the model or type of an image forming apparatus is usually set on a model-by-model basis. Thus, if the same image forming apparatus is used to perform printing as discussed in Japanese Patent Application Laid-Open No. 2020-04158, a similar print setting screen is provided regardless of whether the printer driver is the local printer driver or the cloud printer driver.

However, executable functions may differ between the local printer driver and the cloud printer driver. For example, there may be a setting item or setting value that one of the printer drivers can write into print data and the other cannot. In such a case, even if the same image forming apparatus is eventually used for printing, using one of the printer drivers enables printing reflecting the setting value set on the print setting screen, and using the other printer driver does not enable printing reflecting the setting value set on the print setting screen.

SUMMARY

According to an aspect of the embodiments, an information processing apparatus on which a first printer driver configured to generate first print data to be transmitted to an image forming apparatus according to a predetermined protocol and a second printer driver configured to generate second print data to be transmitted to a server system according to the predetermined protocol are installed includes a display unit configured to display a first screen in a case where first information for transmitting the first print data to the image forming apparatus is selected, and to display a second screen in a case where second information for transmitting the second print data to the image forming apparatus via the server system is selected, a first transmission unit configured to transmit, to the image forming apparatus, the first print data based on a setting accepted via the displayed first screen, and a second transmission unit configured to transmit, to the server system, the second print data based on a setting accepted via the displayed second screen.

Further features of the disclosure will become apparent from the following description of exemplary embodiments with reference to the attached drawings.

BRIEF DESCRIPTION OF THE DRAWINGS

FIGS. 2A to 2F are diagrams illustrating examples of hardware configurations according to the first exemplary embodiment.

FIGS. 3A to 3F are diagrams illustrating examples of software configurations according to the first exemplary embodiment.

FIG. 6 is a diagram illustrating an example of a sequence between pieces of software and services related to registration of a cloud print-capable printer in a cloud print service according to the first exemplary embodiment.

FIGS. 9A to 9C are diagrams illustrating examples of user interfaces (UIs) of the print setting extension application according to the first exemplary embodiment.

FIG. 10 is a flowchart illustrating UI display of the print setting extension application according to the first exemplary embodiment.

FIGS. 12A to 12C are flowcharts illustrating examples of processing performed during printing according to the first exemplary embodiment.

FIGS. 13A and 13B are diagrams illustrating examples of UIs of a print setting extension application according to a second exemplary embodiment.

FIG. 14 is a flowchart illustrating processing performed by a cloud print-capable printer according to the second exemplary embodiment.

FIG. 15 is a flowchart illustrating processing performed when the print setting extension application displays a UI according to the second exemplary embodiment.

DESCRIPTION OF THE EMBODIMENTS

Exemplary embodiments of the disclosure will be described below with reference to the drawings.

Figure 1:
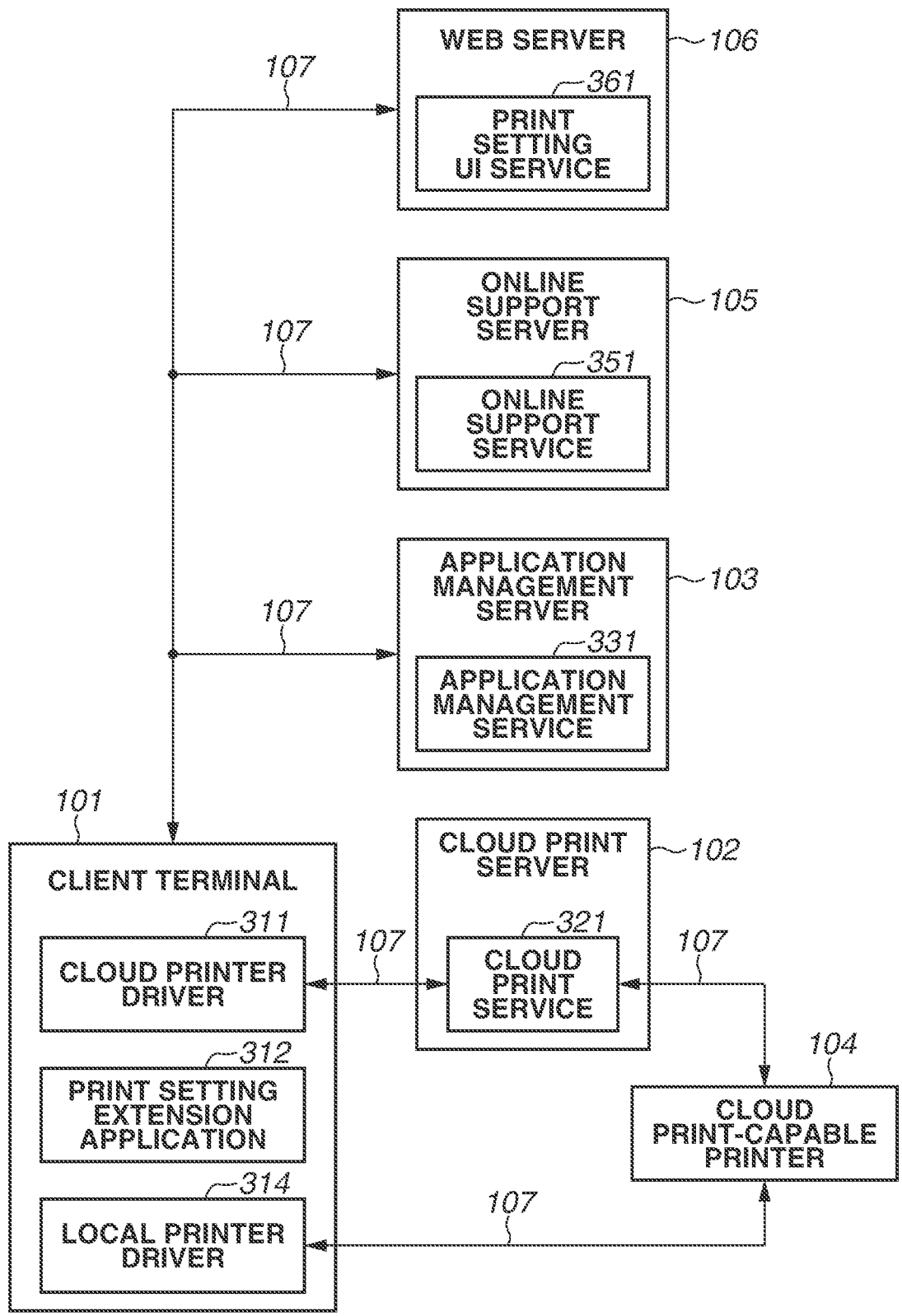
FIG. 1 is a diagram illustrating an example of a system configuration according to a first exemplary embodiment.

FIG. 1 illustrates a configuration of a printing system for cloud printing according to a first exemplary embodiment of the disclosure. A client terminal 101, a cloud print server 102, an application management server 103, a cloud print-capable printer 104, an online support server 105, and a web server 106 are connected via a network 107.

While FIG. 1 illustrates one client terminal 101 and one cloud print-capable printer 104, the printing system may include a plurality of the client terminals 101 and a plurality of the cloud print-capable printers 104.

The cloud print server 102, the application management server 103, the online support server 105, and the web server 106 each may be a server system including a plurality of information processing apparatuses. Configuring each of the servers as a server system including a plurality of information processing apparatuses enables load distribution on the plurality of information processing apparatuses.

The cloud print server 102, the application management server 103, the online support server 105, and the web server 106 may be virtually included in one physical information processing apparatus.

The network 107 is assumed to be a wide area network (WAN), such as the Internet, for the sake of connection to cloud services. Alternatively, the network 107 may be an entirely closed environment such as a corporate local area network (LAN).

The client terminal 101 is an information processing apparatus such as a personal computer (PC), a tablet, or a smartphone. The client terminal 101 is directly operated by the user. Application software can be run on the client terminal 101.

The cloud print-capable printer 104 is a device that actually performs printing on recording media such as a sheet of paper. The cloud print-capable printer 104 is an image forming apparatus that converts print data received via the network 107 into image data and prints the image data.

The cloud print-capable printer 104 can receive print data from the client terminal 101 via the cloud print server 102 or can receive print data directly from the client terminal 101 without going through the cloud print server 102.

The cloud print-capable printer 104 receives print data generated by a cloud printer driver 311 on the client terminal 101, via the cloud print server 102. The cloud print-capable printer 104 also receives print data generated by a local printer driver 314 on the client terminal 101, not via the cloud print server 102.

The cloud print server 102 accepts print instructions and document data from an external apparatus. The cloud print server 102 converts the received document data into print data and then transmits the print data to the cloud print-capable printer 104.

The application management server 103 stores and manages various applications.

The application management server 103 receives, from the client terminal 101, identification information about an application and a request for downloading the application, and transmits the application identified based on the received identification information to the client terminal 101.

The online support server 105 is a server apparatus that provides an online support service 351. The online support service 351 provides a file describing information for extending the functions of the client terminal 101 to the client terminal 101.

The web server 106 is a server apparatus that provides a print setting user interface (UI) service 361. The print setting UI service 361 communicates with a print setting extension application 312 and provides a print setting UI.

Next, a hardware configuration of the printing system according to the present exemplary embodiment will be described with reference to FIGS. 2A to 2F.

FIG. 2A is a block diagram illustrating a hardware configuration of the client terminal 101.

The client terminal 101 includes a display unit 216, an operation unit 217, a storage unit 214, a control unit 211, and a network communication unit 215.

The storage unit 214 includes one or a plurality of nonvolatile storage devices such as hard disk drives (HDDs) and/or solid-state drives (SSDs). The storage unit 214 can store and rewrite digital data. A program for running the print setting extension application 312 is stored in the storage unit 214.

The control unit 211 includes a central processing unit (CPU) 212 and a memory 213, and controls entire operation of the client terminal 101. The CPU 212 loads a program stored in the storage unit 214 into the memory 213 and executes the program. The memory 213 is a main storage memory of the CPU 212, and is used as a work area or a temporary storage area for loading various programs.

The network communication unit 215 is a device for communicating with the network 107 (the external network), and inputs and outputs digital data from and to external servers and client terminals via the network 107. The client terminal 101 communicates with the cloud print server 102 and the cloud print-capable printer 104 via the network communication unit 215. The client terminal 101 also communicates with the web server 106, the online support server 105, and the application management server 103 via the network communication unit 215.

The display unit 216 is a device for displaying visual information to the user in real time. An example of the display unit 216 is a liquid crystal display. The operation unit 217 is a device for accepting an input from the user. Examples thereof include a keyboard and a mouse. A device having the functions of both the display unit 216 and the operation unit 217, like a touch screen, may be used.

FIG. 2B is a block diagram illustrating a hardware configuration of the cloud print server 102. The cloud print server 102 includes a storage unit 224, a control unit 221, and a network communication unit 225.

The storage unit 224, the control unit 221, and the network communication unit 225 are similar to the storage unit 214, the control unit 211, and the network communication unit 215 of the client terminal 101, respectively. A description thereof will thus be omitted.

The cloud print server 102 will be described assuming that the cloud print server 102 includes one information processing apparatus having the hardware configuration illustrated in FIG. 2B, but the cloud print server 102 may include a plurality of information processing apparatuses having the hardware configuration illustrated in FIG. 2B.

FIG. 2C is a block diagram illustrating a hardware configuration of the application management server 103. The application management server 103 includes a display unit 236, an operation unit 237, a storage unit 234, a control unit 231, and a network communication unit 235.

The display unit 236, the operation unit 237, the storage unit 234, the control unit 231, and the network communication unit 235 are similar to the display unit 216, the operation unit 217, the storage unit 214, the control unit 211, and the network communication unit 215 of the client terminal 101, respectively. A description thereof will thus be omitted.

The application management server 103 will be described assuming that the application management server 103 includes one information processing apparatus having the hardware configuration illustrated in FIG. 2C, but the application management server 103 may include a plurality of information processing apparatuses.

FIG. 2D is a block diagram illustrating a hardware configuration of the cloud print-capable printer 104. The cloud print-capable printer 104 includes a display unit 246, an operation unit 247, a storage unit 244, a control unit 241, a network communication unit 245, and a printing unit 248.

The display unit 246 is a device for displaying information to the user in real time. Examples thereof include a touch screen and a light-emitting diode (LED) provided on the cloud print-capable printer 104.

The operation unit 247 is a device for accepting an input from the user. The operation unit 247 may include hardware keys, such as a numerical keypad, in addition to a touch screen. The storage unit 244 and the control unit 241 are similar to the storage unit 214 and the control unit 211 of the client terminal 101, respectively. A description thereof will thus be omitted.

The network communication unit 245 is a device for communicating with the network 107 (the external network). A main function of the network communication unit 245 is to receive print data and transmit information about a status of the cloud print-capable printer 104, such as an error, to external servers.

The printing unit 248 is a device that performs print processing on a sheet stored in a cassette or placed on a tray by performing a series of operations including sheet feeding, printing, and sheet discharge. The printing method is not particularly limited, and an electrophotographic method or an inkjet method may be used. The printing unit 248 also includes devices to be used in sheet discharge. Examples thereof include a duplex printing unit and finishing apparatuses for stapling and punching.

In the present exemplary embodiment, a single-function printer that simply performs a print function is described as an example of the cloud print-capable printer 104. Alternatively, a multifunction peripheral (MFP) having a scanner function and a facsimile (FAX) function may be used as the cloud print-capable printer 104.

FIG. 2E is a block diagram illustrating a hardware configuration of the online support server 105. In the present exemplary embodiment, the online support server 105 will be described assuming that the online support server 105 includes one information processing apparatus. Alternatively, the online support server 105 may include a plurality of information processing apparatuses. The online support server 105 includes a display unit 256, an operation unit 257, a storage unit 254, a control unit 251, and a network communication unit 255. The display unit 256 and the operation unit 257 are similar to the display unit 216 and the operation unit 217 of the client terminal 101, respectively. A description thereof will thus be omitted. The storage unit 254 includes one or a plurality of HDDs and/or SSDs. The storage unit 254 stores the file describing information for extending the functions provided by the client terminal 101.

The control unit 251 includes a CPU 252 and a memory 253. The CPU 252 entirely controls the online support server 105. The memory 253 is used by the CPU 252 to perform processing. The network communication unit 255 is an interface for the online support server 105 to communicate with the client terminal 101. The online support server 105 receives an acquisition request for a file stored in the storage unit 254 and transmits the file to the client terminal 101 via the network communication unit 255.

FIG. 2F is a block diagram illustrating a hardware configuration of the web server 106. The web server 106 includes a display unit 266, an operation unit 267, a storage unit 264, a control unit 261, and a network communication unit 265.

The display unit 266, the operation unit 267, the storage unit 264, the control unit 261, and the network communication unit 265 are similar to the display unit 216, the operation unit 217, the storage unit 214, the control unit 211, and the network communication unit 215 of the client terminal 101, respectively. A description thereof will thus be omitted.

The web server 106 will be described assuming that the web server 106 includes one information processing apparatus having the hardware configuration illustrated in FIG. 2F, but the web server 106 may include a plurality of information processing apparatuses.

Next, a software configuration of the printing system according to the present exemplary embodiment will be described with reference to FIGS. 3A to 3F.

FIG. 3A is a block diagram illustrating a software configuration of the client terminal 101.

The client terminal 101 includes the cloud printer driver 311, the print setting extension application 312, an operating system (OS) 313, the local printer driver 314, and a document generation application 315.

The cloud printer driver 311 includes a cloud print service interface (I/F) 31101, a print data management unit 31102, a UI unit 31103, and a print setting extension application I/F 31104.

The cloud print service I/F 31101 processes the exchange of data and commands with a cloud print service 321. The cloud print service I/F 31101 transmits print data to the cloud print service 321 and receives printer information from the cloud print service 321.

The print data management unit 31102 performs processing such as generation of print data and transmission of print data.

The UI unit 31103 displays a print setting screen prepared by the cloud printer driver 311, accepts a user's operation on the client terminal 101, and the like.

The print setting extension application I/F 31104 processes the exchange of data and commands with the print setting extension application 312.

The cloud printer driver 311 can generate print data printable by a plurality of different models of image forming apparatuses. The plurality of different models of image forming apparatuses may be image forming apparatuses manufactured by different print vendors. The cloud printer driver 311 may be provided by the vendor providing the OS 313 or provided by the vendor providing the cloud print service 321. Alternatively, the cloud printer driver 311 may be provided by a printer vendor.

The print setting extension application 312 includes an extended print setting unit 31201, an extension application UI unit 31202, and a print data management unit 31203.

The extended print setting unit 31201 manages the setting values of printer vendor-specific print setting items not supported by the cloud printer driver 311 or the local printer driver 314. The extended print setting unit 31201 may manage the setting values of print setting items supported by the cloud printer driver 311 and/or the local printer driver 314 in addition to those of the printer vendor-specific print setting items.

The extension application UI unit 31202 displays a print setting screen prepared by the print setting extension application 312, accepts a user's operation on the client terminal 101, and the like.

The print data management unit 31203 performs processing such as generation of print data, editing of print data generated by the cloud printer driver 311 or the local printer driver 314, and transmission of print data.

The OS 313 includes an input/output control unit 31300, a print setting extension application management unit 31301, an extended setup information file search unit 31302, and an additional identification information addition processing unit 31303.

The input/output control unit 31300 accepts an operation performed by the user of the client terminal 101.

The print setting extension application management unit 31301 manages the installation of the print setting extension application 312 and processes the exchange of data and commands. Moreover, the print setting extension application management unit 31301 searches an application management service 331 for the print setting extension application 312 by using an application identifier (ID) (AppID) extracted from an extended setup information file.

The extended setup information file search unit 31302 searches the online support service 351 for an extended setup information file having the same device ID as that held by the OS 313 as a search key. The extended setup information file search unit 31302 then downloads the extended setup information file found in the search.

The additional identification information addition processing unit 31303 adds first additional information indicating a major application category to the device ID. In the present exemplary embodiment, the major application category refers to the category of the type of application corresponding to a connected device. If the application corresponds to a printer, additional information "printer_" is added to the device ID. The additional information "printer_" is merely an example, and other character strings, numerals, and symbols may be used.

The local printer driver 314 includes a print data management unit 31401, a UI unit 31402, and a print setting extension application I/F 31403.

The print data management unit 31401 performs processing such as generation of print data and transmission of print data.

The UI unit 31402 displays a print setting screen prepared by the local printer driver 314, accepts a user's operation on the client terminal 101, and the like.

The print setting extension application I/F 31403 processes the exchange of data and commands with the print setting extension application 312.

The local printer driver 314 can generate print data printable by a plurality of different models of image forming apparatuses. The plurality of different models of image forming apparatuses may be image forming apparatuses manufactured by different print vendors. The local printer driver 314 may be provided by the vendor providing the OS 313 or manufactured by a printer vendor.

The document generation application 315 includes a UI unit 31501. The document generation application 315 has the functions of generating, editing, and displaying documents. The document generation application 315 may simply have the function of displaying document data.

The cloud printer driver 311 and the local printer driver 314 yet to be installed are built in the OS 313 of the client terminal 101, and are available after installed. Each of the cloud printer driver 311 and the local printer driver 314 generates print data according to the Internet Printing Protocol (IPP). The print data generated by the cloud printer driver 311 or the local printer driver 314 is transmitted to the cloud print-capable printer 104 or the cloud print server 102 by a communication method compliant with the IPP.

FIG. 3B is a block diagram illustrating a software configuration of the cloud print server 102.

An account management unit 32101 manages the authentication of tenants and users registered in the cloud print service 321.

A device management unit 32102 manages device information about printers registered in the cloud print service 321. Examples of the device information include a device ID, a tenant ID, a printer name, device configuration information, and capability information.

A print management unit 32103 determines whether to permit a print data delivery request from the cloud print-capable printer 104, and manages the delivery of print data.

A print queue management unit 32104 receives print data from an external apparatus, such as the client terminal 101, and stores the received print data in an area provided in the storage unit 224 of the cloud print server 102.

FIG. 3C is a block diagram illustrating a software configuration of the application management server 103.

The application management server 103 includes the application management service 331. The application management service 331 includes an application management I/F 33101, an application management unit 33102, and a UI unit 33103.

The application management I/F 33101 processes the exchange of data and commands with the OS 313 of the client terminal 101.

The application management unit 33102 manages applications registered in the application management service 331. The application management unit 33102 also issues an application ID when an application is registered in the application management service 331.

The UI unit 33103 displays a UI prepared by the application management service 331, accepts a user's operation on the application management server 103, and the like.

FIG. 3D is a block diagram illustrating a software configuration of the cloud print-capable printer 104. The cloud print-capable printer 104 includes a device control unit 341. The device control unit 341 includes a print data reception unit 34101, a device management unit 34102, a print output unit 34103, a UI operation unit 34104, and a cloud print service I/F 34105.

The print data reception unit 34101 accepts print data transmitted from an external apparatus via the network 107, and stores the print data in the storage unit 244 of the cloud print-capable printer 104.

The device management unit 34102 manages options connected to the cloud print-capable printer 104, capability information, remaining paper amount, and remaining toner/ink levels.

The print output unit 34103 controls print processing on recording media such as a sheet of paper.

The UI operation unit 34104 displays a UI on the operation unit 247 of the cloud print-capable printer 104, and acquires instructions and information input via the UI.

The cloud print service I/F 34105 processes the exchange of data and commands with the cloud print service 321.

Figure 3E:
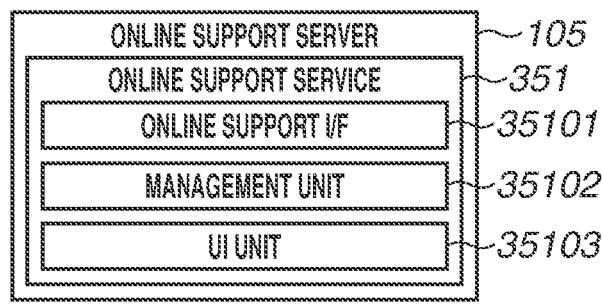

FIG. 3E is a block illustrating a software configuration of the online support server 105. The online support server 105 includes an online support service 351 including an online support I/F 35101, a management unit 35102, and a UI unit 35103.

The online support I/F 35101 processes the exchange of data and commands with the OS 313 of the client terminal 101. The online support I/F 35101 receives a search request for the file for extending the functions of the client terminal 101 from the client terminal 101. The online support I/F 35101 transmits a response to the search request to the client terminal 101.

The management unit 35102 manages the extended setup information file registered in the online support service 351. The extended setup information file is the file describing information for extending the functions of the client terminal 101. For example, a printer ID of the cloud print-capable printer 104 connected to the client terminal 101 and application identification information about the print setting extension application 312 for extending the cloud printer driver 311 are stored as the extended setup information file.

The UI unit 35103 displays a UI prepared by the online support service 351, accepts a user's operation on the online support server 105, and the like.

Figure 3F:
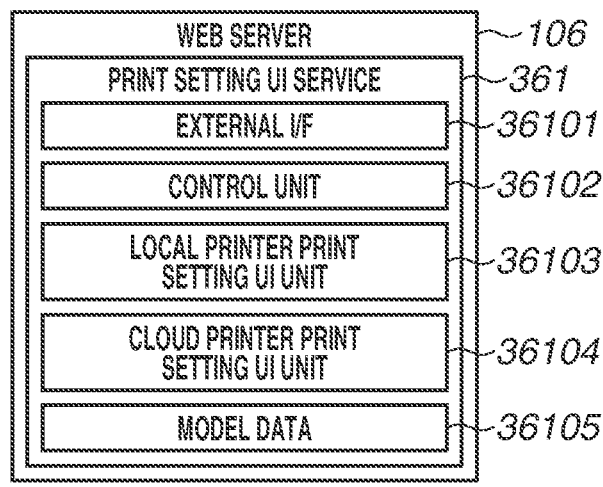

FIG. 3F is a block diagram illustrating a software configuration of the web server 106. The web server 106 includes the print setting UI service 361. The print setting UI service 361 includes an external I/F 36101, a control unit 36102, a local printer print setting UI unit 36103, a cloud printer print setting UI unit 36104, and model data 36105.

The external I/F 36101 performs processing for communicating with an external apparatus so that the external apparatus can access the print setting UI service 361. More specifically, the processing corresponds to processing in a case where the print setting UI service 361 is accessed using a Uniform Resource Locator (URL) published by the print setting UI service 361 or accessed using a web application programming interface (API) defined and published by the print setting UI service 361.

When the print setting UI service 361 is accessed via the external I/F 36101, the control unit 36102 analyzes information being exchanged in the communication and performs processing based on the information.

The local printer print setting UI unit 36103 is a module that generates a local printer-specific print setting screen.

The cloud printer print setting UI unit 36104 is a module that generates a cloud printer-specific print setting screen.

The model data 36105 corresponds to model information about the cloud print-capable printer 104. Examples thereof include information about setting prohibitions, and character string resources for UI display.

Next, an example of a procedure performed by a user who wishes to register the print setting extension application 312 and an example of a sequence between pieces of software and services according to the present exemplary embodiment will be described with reference to FIGS. 4 to 10.

Figure 4:
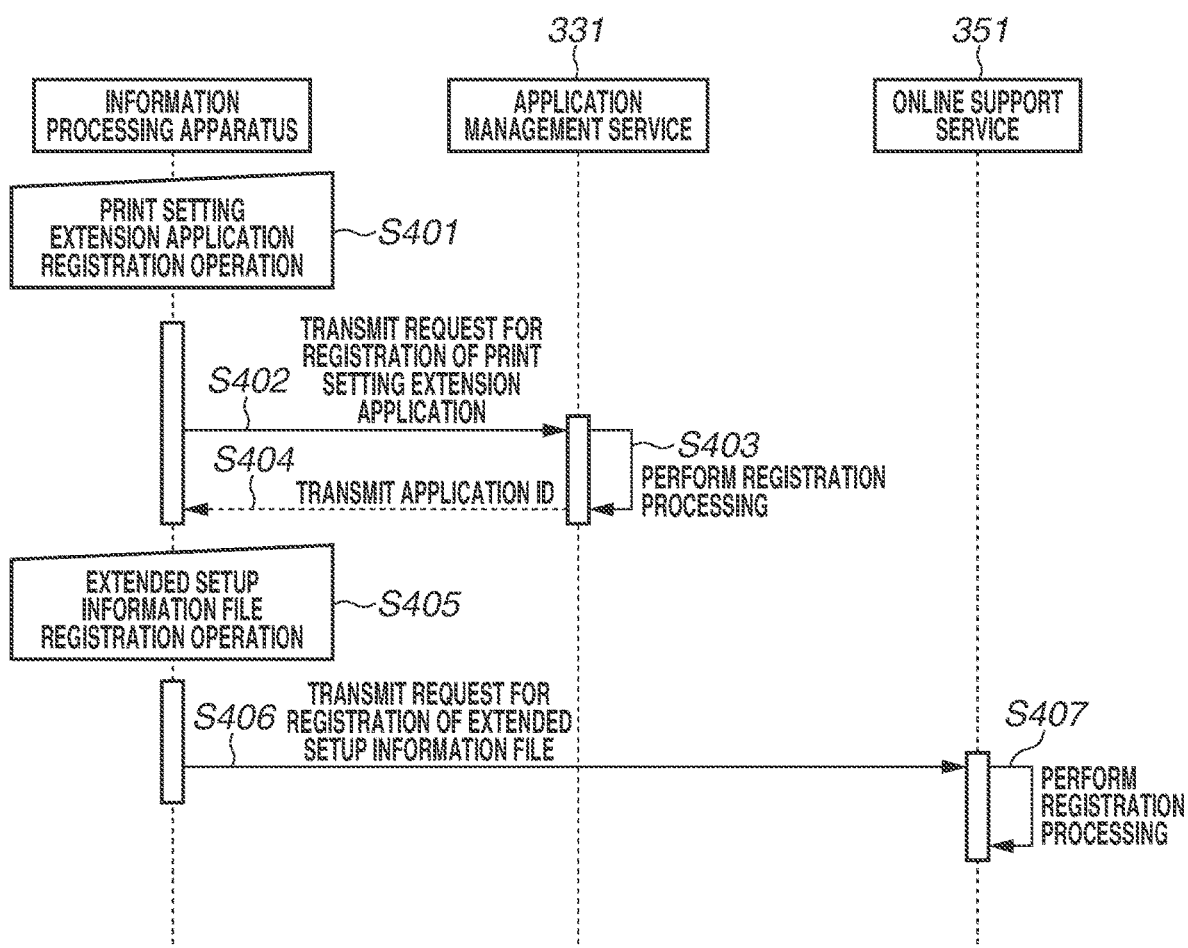
FIG. 4 is a diagram illustrating an example of a sequence between pieces of software and services related to registration of a print setting extension application according to the first exemplary embodiment.

First, an example of registration of the print setting extension application 312 in the application management service 331, and an example of processing for registering the extended setup information file in the online support service 351 will be described with reference to FIG. 4. The following description assumes a case where the user, such as a printer vendor, who wishes to register the print setting extension application 312 uploads the print setting extension application 312 from an information processing apparatus to the application management server 103. This information processing apparatus may be the client terminal 101 or any other information processing apparatus.

In the present example, the print setting extension application 312 for extending the print settings of the cloud printer driver 311 and the local printer driver 314 that are installed on the client terminal 101 in advance is uploaded to the application management service 331.

In step S401, the information processing apparatus accepts a print setting extension application registration operation from the user who wishes to register the print setting extension application 312.

In step S402, the information processing apparatus transmits a registration request for registering the print setting extension application 312 for extending the print settings of the cloud printer driver 311 to the application management service 331.

In step S403, in response to the registration request, the application management service 331 performs registration processing on the print setting extension application 312. More specifically, the application management unit 33102 of the application management service 331 registers the print setting extension application 312 in the storage unit 234, and generates an application ID that is the identification information about the registered print setting extension application 312.

In step S404, the application management service 331 transmits the generated application ID to the information processing apparatus from which the registration request is transmitted.

In step S405, the information processing apparatus accepts an extended setup information file registration operation from the user who has registered the print setting extension application 312. The extended setup information file is generated by the person who has registered the print setting extension application 312. In the present example, the person who has registered the print setting extension application 312 generates the extended setup information file that describes the application ID received from the application management service 331. The extended setup information file describes the received application ID, and a character string or strings in which additional identification information is added to the printer ID(s) of one or a plurality of printers of which print settings can be made using the print setting extension application 312.

In step S406, the information processing apparatus transmits a registration request for registering the extended setup information file to the online support service 351. In step S407, the online support service 351 performs registration processing on the extended setup information file for which the registration request is received.

The registration of the print setting extension application 312 in the application management service 331 and the registration processing on the extended setup information file are thereby completed.

Figure 5A:
FIGS. 5A and 5B are diagrams illustrating examples of various types of data according to the first exemplary embodiment.

FIG. 5A illustrates an example of the extended setup information file generated by the person who has registered the print setting extension application 312.

The extended setup information file includes a file name 1606 of the extended setup information file, and an application ID (AppID) 1607 of the print setting extension application 312. In the present example, the AppID 1607 is "000ABC". The AppID 1607 is received from the application management service 331 in step S404 of FIG. 4.

The extended setup information file also includes a device ID (DeviceID) 1608 that is identification information about a printer that can process the print data for which the print settings are made using the print setting extension application 312 having the AppID 1607. When the client terminal 101 transmits an acquisition request for the extended setup information file to the online support service 351, the additional identification information addition processing unit 31303 adds a predetermined character string (additional identification information) to the identification information (the printer ID) about the cloud print-capable printer 104. Taking the predetermined character string into account, the DeviceID 1608 is set as "printer_device001" obtained by adding the predetermined character string to the identification information (the printer ID).

Next, a procedure performed when the user registers the cloud print-capable printer 104 in the cloud print service 321 will be described with reference to FIG. 6.

In step S601, the cloud print-capable printer 104 accepts a printer registration operation for registering the cloud print-capable printer 104 in the cloud print service 321, from the user via the UI operation unit 34104.

In step S602, the cloud print-capable printer 104 transmits a printer registration request to the cloud print service 321 along with the device ID of the cloud print-capable printer 104. The device ID transmitted to the cloud print service 321 is, for example, a hardware ID (HWID) that is assigned on a printer model basis. The device ID may be any other information from which the printer model can be identified. Examples thereof include a compatible ID (COID) and a device name.

In step S603, the cloud print service 321 having received the printer registration request transmits the URL of the cloud print service 321 for printer registration, to the cloud print-capable printer 104. In step S604, the user accesses the URL from the cloud print-capable printer 104 or the information processing apparatus, and inputs a user ID and a password for using the cloud print service 321.

In step S605, the cloud print service 321 controls the account management unit 32101 to perform authentication processing. If the user is successfully authenticated, then in step S606, the cloud print service 321 transmits an acquisition request for information to be used in registering the cloud print-capable printer 104, to the cloud print-capable printer 104. The information to be used in registration includes the capability information and the device configuration information about the cloud print-capable printer 104.

In step S607, the cloud print-capable printer 104 transmits the requested information to the cloud print service 321 as a response to the request.

In step S608, the cloud print service 321 controls the print queue management unit 32104 of the cloud print service 321 to generate a print queue for transmitting print data to the cloud print-capable printer 104. When the processing in step S608 is completed, device information illustrated in FIG. 5B is registered in the cloud print service 321.

Figure 5B:
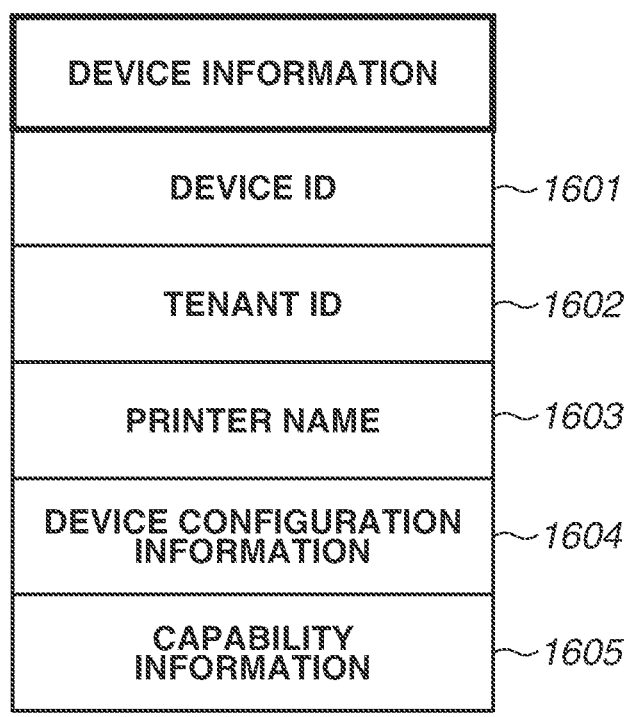

Referring to FIG. 5B, a device ID 1601 is acquired from the cloud print-capable printer 104. A tenant ID 1602 is identification information for identifying the tenant to which the user who can use the cloud print-capable printer 104 identified by the device information belongs. The term "tenant" refers to a group including one or a plurality of users. A printer name 1603 is a name of the cloud print-capable printer 104 from which the registration request is transmitted. The printer name 1603 is acquired from the cloud print-capable printer 104 based on the printer registration operation performed in step S601 of FIG. 6 or the acquisition request from the cloud print service 321, and is used as the name of the print queue. The printer name 1603 may be set using any other method. Device configuration information 1604 is information about a hardware configuration of the cloud print-capable printer 104. The hardware configuration refers to information about, for example, whether a duplex printing unit is attached to the cloud print-capable printer 104, whether a finisher capable of stapling is attached thereto, and whether a finisher capable of punching is attached thereto.

The device configuration information 1604 is acquired by the cloud print service 321 transmitting a capability information acquisition request to the cloud print-capable printer 104. Capability information 1605 is capability information about the cloud print-capable printer 104. The capability information 1605 indicates executable functions of the cloud print-capable printer 104, such as whether the cloud print-capable printer 104 is capable of color printing, whether the cloud print-capable printer 104 is capable of two-sided printing, and whether the cloud print-capable printer 104 can use a toner saving mode. The capability information 1605 is also acquired by the cloud print service 321 transmitting a capability information acquisition request to the cloud print-capable printer 104.

In step S609, the cloud print-capable printer 104 accepts a printer registration check operation from the user via the UI operation unit 34104. In step S610, the cloud print-capable printer 104 transmits a printer registration status request to the cloud print service 321. In step S611, the cloud print service 321 returns a printer registration status to the cloud print-capable printer 104. In step S612, the cloud print-capable printer 104 displays the printer registration status on the UI operation unit 34104. The processing in steps S609 to S612 corresponds to a method for checking whether the information about the cloud print-capable printer 104 is registered in the cloud print service 321, and thus may not necessarily be performed.

In the present exemplary embodiment, the printer registration status is described to be checked by the cloud print-capable printer 104. Alternatively, the cloud print service 321 may transmit a registration completion notification to the cloud print-capable printer 104 after the print queue is generated in step S608.

Next, an example of installation of the print setting extension application 312 in a case where the user performs a cloud print-capable printer setup operation on the client terminal 101 will be described with reference to FIG. 7.

In step S701, the OS 313 of the client terminal 101 accepts a cloud print-capable printer setup operation from the user via the input/output control unit 31300.

An example of the cloud print-capable printer setup operation is as follows. The user issues a printer search instruction to the client terminal 101. The OS 313 searches for both printers registered in the cloud print service 321 and printers connected to the network 107. FIG. 7 illustrates a case where information about the registered printers is acquired from the cloud print service 321 and a printer registered in the cloud print service 321 is set up.

In step S702, the OS 313 transmits an acquisition request for a list of printers registered in the cloud print service 321.

In step S703, the cloud print service 321 instructs the client terminal 101 to display an authentication screen of the cloud print service 321. More specifically, the cloud print service 321 notifies the client terminal 101 of a URL for displaying the authentication screen.

The client terminal 101 accesses the URL, whereby the authentication screen is displayed on the client terminal 101.

In step S704, the client terminal 101 transmits authentication information (a user ID and a password) input to the displayed authentication screen and an authentication request to the cloud print service 321.

In step S705, the cloud print service 321 performs user authentication based on the received user ID and password, and transmits the authentication result to the client terminal 101. In the present example, the authentication is assumed to have succeeded. The cloud print service 321 transmits a list of printers usable by the authenticated user, which is the information about the printers registered in the cloud print service 321, to the client terminal 101 along with the authentication result.

In steps S703 to S705 described above, the user authentication is performed using the user ID and the password input by the user. Alternatively, if the client terminal 101 accesses the cloud print service 321 using an access token, the user authentication may be performed without displaying a login screen (an authentication screen).

In parallel with the processing in steps S702 to S705, the client terminal 101 transmits a search packet to the network 107 and receives a response from the cloud print-capable printer 104.

The client terminal 101 display a list of the printer information received from the cloud print service 321 in step S705 and the printer information about the cloud print-capable printer 104 detected by the transmission of the search packet to the network 107. In step S706, the client terminal 101 accepts a user's selection of printer information corresponding to the printer to be used. In the present example, printer information about the cloud print-capable printer 104 registered in the cloud print service 321 is assumed to be selected based on the printer information received from the cloud print service 321 in step S705.

In step S707, the client terminal 101 transmits an acquisition request for printer information about the selected cloud print-capable printer 104 to the cloud print service 321. More specifically, the client terminal 101 transmits an acquisition request for the capability information about the cloud print-capable printer 104 and the device ID of the cloud print-capable printer 104 to the cloud print service 321.

In step S708, the cloud print service 321 transmits the printer information to the client terminal 101 in response to the acquisition request for the printer information. In step S708, the cloud print service 321 transmits the device ID, the capability information, and the device configuration information about the cloud print-capable printer 104 to the client terminal 101.

In step S709, the client terminal 101 performs installation processing on the cloud printer driver 311 on the basis that the cloud print-capable printer 104 is registered in the cloud print service 321. The installation of the cloud printer driver 311 may be started based on the printer selection operation or based on the acquisition of the printer information in step S708.

In step S710, the client terminal 101 generates a print queue associated with the installed cloud printer driver 311, in the client terminal 101. With the print queue generated, the association of the device ID and the printer name of the cloud print-capable printer 104 with the cloud printer driver 311 is registered in the client terminal 101. The printer name registered at this time serves as printer information to be displayed later on a print setting initial screen for the purpose of selecting a print queue. The printer name can be changed to any character string by the user operating the client terminal 101.

In step S711, the client terminal 101 performs additional identification information addition processing on the device ID received from the cloud print service 321. The additional identification information addition processing is performed by the additional identification information addition processing unit 31303 of the OS 313. The additional identification information is any character string different from normal device IDs. In the present exemplary embodiment, to make a distinction from the applications of other devices, the OS 313 adds the additional identification information "printer_", which indicates that the application corresponds to a printer, to the device ID. The additional identification information "printer_" is merely an example, and other character strings, numerals, and symbols may be used. If the device ID of the cloud print-capable printer 104 is "device001", the device ID after the additional identification information addition processing is "printer_device001".

In step S712, the client terminal 101 requests the online support service 351 to search for the extended setup information file, via the extended setup information file search unit 31302. At this time, the client terminal 101 transmits the device ID to which the additional identification information is added in step S711, to the online support service 351 along with the search request for the extended setup information file. The management unit 35102 of the online support service 351 searches for the extended setup information file in which the received device ID with the additional identification information is described. In step S713, the online support service 351 transmits the extended setup information file found in the search to the client terminal 101. The extended setup information file transmitted at this time is the one described with reference to FIG. 5A.

In step S714, the client terminal 101 detects the application ID from the acquired extended setup information file. By performing step S714, the client terminal 101 detects the application ID of the print setting extension application 312 that can be used in using the cloud print-capable printer 104 registered in the cloud print service 321.

In step S715, the client terminal 101 transmits an acquisition request for the print setting extension application 312 to the application management service 331, using the detected application ID. For example, in a case where the extended setup information file illustrated in FIG. 5A is acquired, the client terminal 101 transmits an acquisition request for the print setting extension application 312 having the application ID "000ABC".

In step S716, the application management service 331 transmits the print setting extension application 312 having the same application ID as that in the acquisition request to the client terminal 101.

In step S717, the client terminal 101 installs the acquired print setting extension application 312 in association with the print queue in the client terminal 101. In step S717, the client terminal 101 associates the print queue generated in step S710 with the application ID of the print setting extension application 312. This enables activation of the print setting extension application 312 in making print settings for printing using the print queue generated in step S710.

In the foregoing description, both the printers registered in the cloud print service 321 and the printers connected to the network 107 are searched for based on the operation accepted in step S701. Alternatively, the sequence illustrated in FIG. 7 may be performed with a search range limited to the printers registered in the cloud print service 321.

Next, a procedure performed when the user generates a print queue of the local printer driver 314 corresponding to the cloud print-capable printer 104 will be described with reference to FIG. 11.

In step S1101, the client terminal 101 accepts a printer search instruction from the user. The printer search instruction that the client terminal 101 accepts in step S1101 is similar to the one that the client terminal 101 accepts in step S701 of FIG. 7.

In step S1102, the client terminal 101 transmits a printer search packet to the network 107.

In step S1103, the cloud print-capable printer 104 returns printer information, such as the device ID and the printer name of the cloud print-capable printer 104, in response to the printer search packet received from the client terminal 101.

Figure 7:
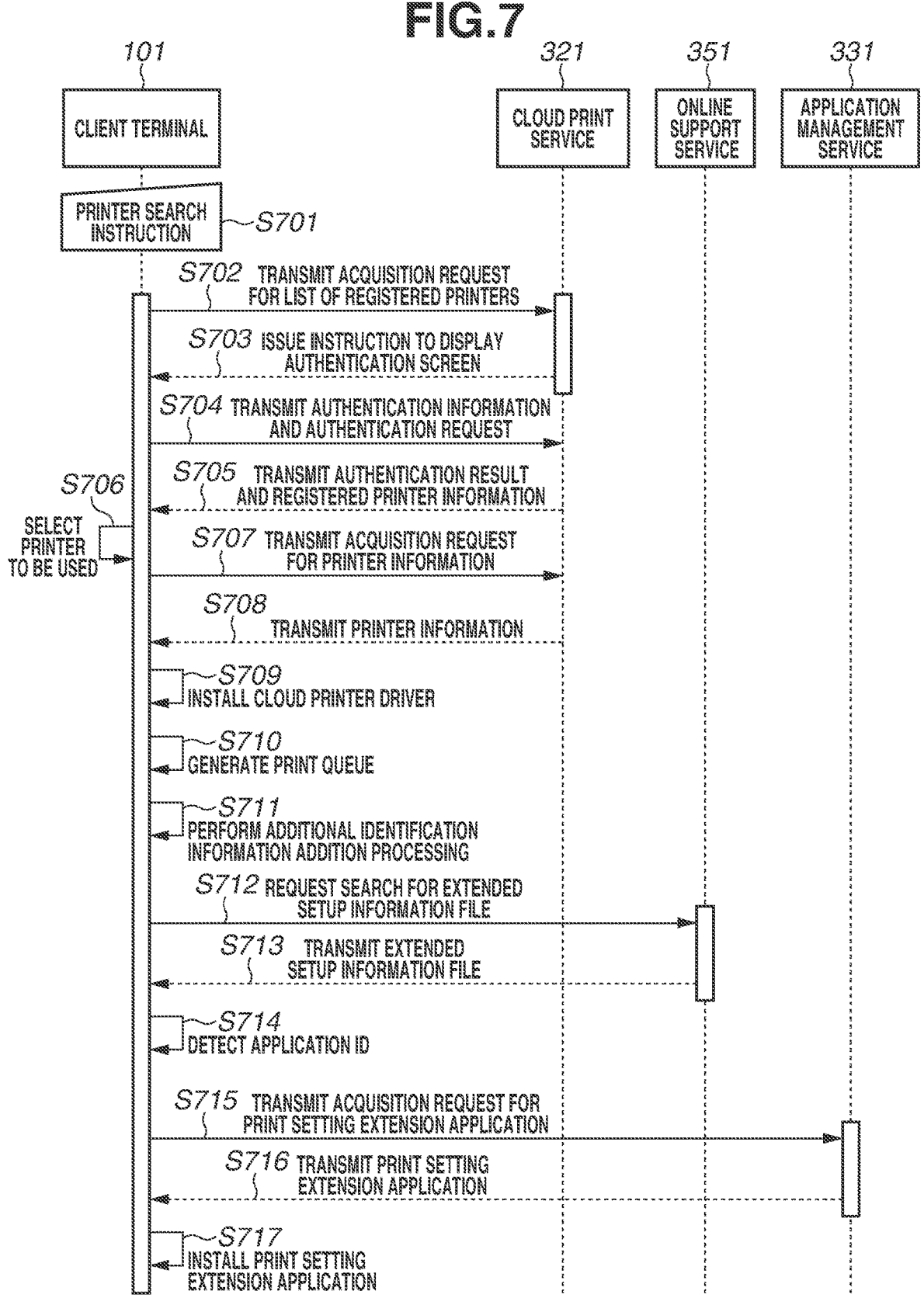
FIG. 7 is a diagram illustrating an example of a sequence between pieces of software and services related to addition of a printer driver according to the first exemplary embodiment.

The processing in steps S1102 and S1103 is performed in parallel with the processing in step S702 to S705 illustrated in FIG. 7.

In step S1104, the client terminal 101 displays a list of printer information about responding printers, and waits for the user to perform a printer selection operation. The processing in step S1104 is similar to the processing in step S706 in FIG. 7. FIG. 11 illustrates a case where the user selects the cloud print-capable printer 104 detected in the search on the network 107.

In step S1105, the client terminal 101 transmits a printer information acquisition request to the cloud print-capable printer 104. The printer information acquisition request transmitted in step S1105 is intended to acquire the capability information and the device configuration information about the cloud print-capable printer 104.

In step S1106, the cloud print-capable printer 104 transmits the printer information to the client terminal 101 in response to the printer information acquisition request.

In step S1107, the client terminal 101 installs the local printer driver 314. The client terminal 101 installs the local printer driver 314 in a case where the selected printer is connected to the network 107 and communicates with the client terminal 101 without going through the cloud print service 321.

In step S1108, the client terminal 101 generates a print queue of the selected printer. In step S1108, the OS 313 generates the print queue in association with the device ID, the printer name, and the local printer driver 314. The printer name associated with the print queue is used as printer information on the print setting initial screen to be described below. When the user selects the printer name corresponding to the print queue generated in step S1108, on the print setting initial screen, print data generated by the local printer driver 314 can be transmitted to the cloud print-capable printer 104. The printer name acquired from the cloud print-capable printer 104 is set as the initial value of the printer name. The user can change the printer name to any character string by operating the client terminal 101.

In step S1109, the client terminal 101 adds additional identification information to the device ID acquired in step S1103.

In step S1110, the client terminal 101 requests the online support service 351 to search for the extended setup information file, via the extended setup information file search unit 31302.

In step S1111, the online support service 351 transmits the extended setup information file found in the search to the client terminal 101.

In step S1112, the client terminal 101 detects an application ID from the acquired extended setup information file.

In step S1113, the client terminal 101 transmits an acquisition request for the print setting extension application 312 to the application management service 331, using the detected application ID.

In step S1114, the application management service 331 transmits the print setting extension application 312 having the same application ID as that in the acquisition request to the client terminal 101.

In step S1115, the client terminal 101 installs the acquired print setting extension application 312 in association with the print queue in the client terminal 101.

The processing for generating a print queue for transmitting print data to the cloud print-capable printer 104 without going through the cloud print service 321 is completed by the foregoing processing. The processing in steps S1109 to S1115 illustrated in FIG. 11 is similar to that of the corresponding blocks in steps S711 to S717 in FIG. 7.

Next, an example of a processing sequence in activating the print setting extension application 312 and making print settings according to the present exemplary embodiment will be described with reference to FIG. 8.

Figure 8:
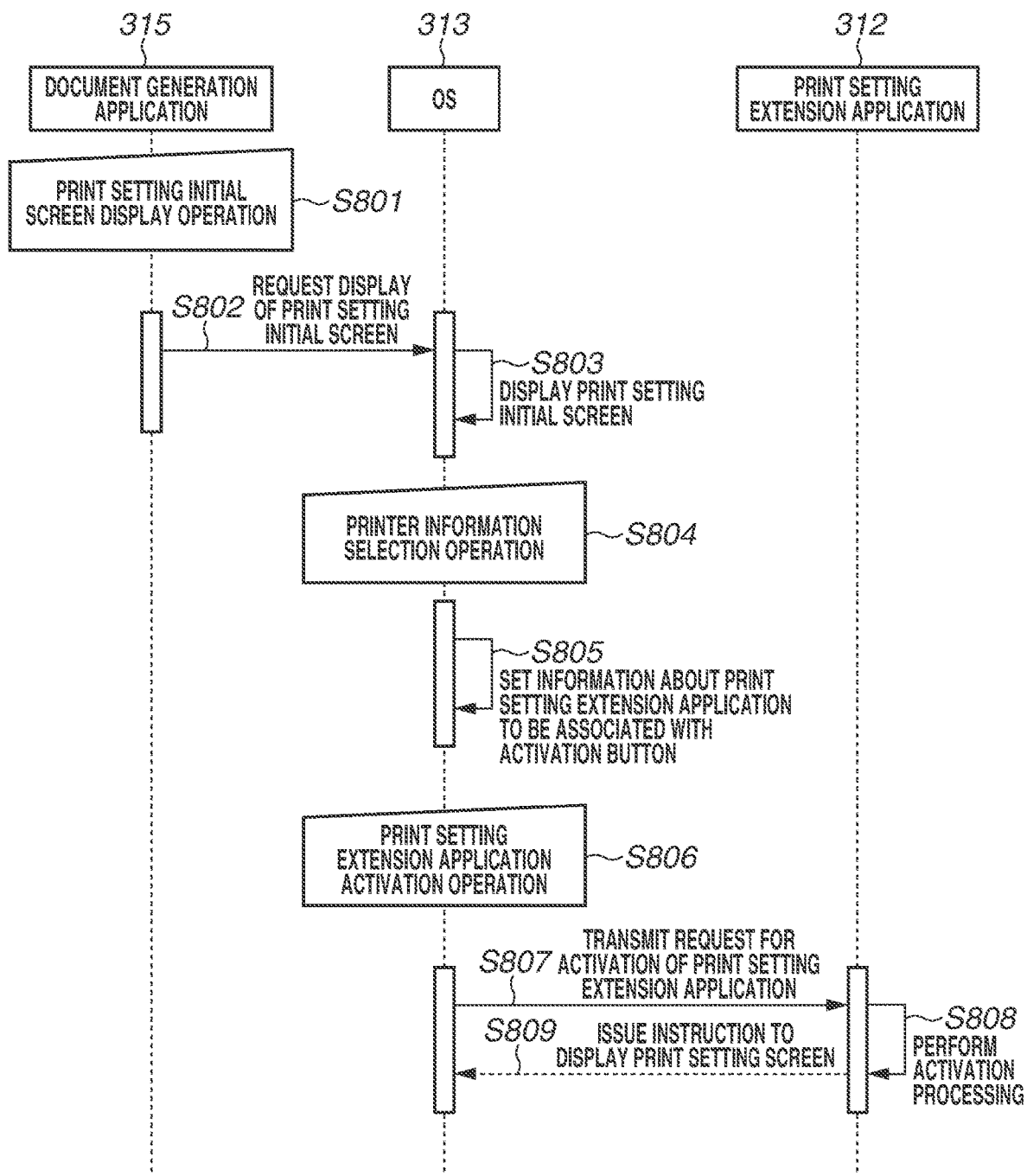
FIG. 8 is a diagram illustrating an example of a sequence between pieces of software and services related to activation of the print setting extension application according to the first exemplary embodiment.

FIG. 8 illustrates an example of processing in a case where the user generates document data using the document generation application 315 and issues an instruction to change print settings from the document generation application 315.

In step S801, the document generation application 315 accepts a print setting initial screen display operation from the user via the UI unit 31501.

In step S802, the document generation application 315 requests the OS 313 to display a print setting initial screen. In step S803, the OS 313 displays a print setting screen (see FIG. 9C) for selecting a print queue, as the print setting initial screen.

FIG. 9C illustrates the print setting initial screen displayed by the OS 313. Depending on the type of the document generation application 315 used, the print setting initial screen can display a part of print setting information, such as an object 943.

Referring to FIG. 9C, an area 941 is an area for selecting printer information about the printer to be used for printing. The printer information refers to the printer name associated with a print queue. Instead of the printer name, any other information from which the print queue to be used for print processing can be identified may be used as the printer information. If the user selects the area 941, a list of printer information associated with print queues stored in the client terminal 101 is displayed. The displayed list of printer information includes both printer information about the printers registered in the cloud print service 321 and printer information about the printers to which the client terminal 101 transmits print data without going through the cloud print service 321. In the present example, it is assumed that a print queue for causing the cloud print-capable printer 104 to print the print data generated by the local printer driver 314 is registered in the client terminal 101. It is also assumed that a print queue for causing the cloud print-capable printer 104 to print the print data generated by the cloud printer driver 311 is registered in the client terminal 101 as well. In such a case, the list of printer information displayed when the area 941 is selected includes both the printer information associated with the print queue for using the local printer driver 314 and the printer information associated with the print queue for using the cloud printer driver 311. The user selects the printer information corresponding to the print queue to be used for print processing, from the displayed list of printer information.

An object 942 is used to activate the print setting extension application 312. An object 940 is used to issue an instruction to perform printing using the printer selected in the area 941.

In step S804, the OS 313 accepts a printer information selection operation from the user via the input/output control unit 31300. In step S804, the selection of the printer information is accepted in the area 941 on the print setting initial screen illustrated in FIG. 9C.

In step S805, with the printer information selected, the OS 313 sets application identification information about the print setting extension application 312 associated with the print queue corresponding to the selected printer information, as information about the print setting extension application 312 to be associated with the object 942 (the activation button). This enables the print setting extension application 312 associated with the print queue corresponding to the selected printer information to be activated when the object 942 is selected.

In step S806, the OS 313 accepts a print setting extension application activation operation from the user via the input/output control unit 31300. In step S806, when the user selects the object 942, the operation to activate the print setting extension application 312 is performed.

In step S807, the OS 313 transmits an activation request to the print setting extension application 312 associated with the object 942, along with parameters such as the printer name associated with the selected printer information and the setting values set on the print setting initial screen. In the present exemplary embodiment, the print setting extension application 312 is activated in a case where the printer information about the print queue for transmitting the print data generated by the local printer driver 314 to the cloud print-capable printer 104 is selected. The print setting extension application 312 is also activated in a case where the printer information about the print queue for transmitting the print data generated by the cloud printer driver 311 to the cloud print-capable printer 104 via the cloud print service 321 is selected.

In step S808, the print setting extension application 312 generates a print setting screen extended based on the functions of the cloud print-capable printer 104, as activation processing. In step S808, the print setting extension application 312 determines whether the printer driver associated with the print queue corresponding to the selected printer information that is received from the OS 313 together with the activation request is the cloud printer driver 311 or the local printer driver 314. The print setting extension application 312 controls display of the print setting screen based on the determination result. Details of the processing in step S808 will be described below with reference to FIG. 10.

In step S809, the print setting extension application 312 instructs the OS 313 to display the generated print setting screen. The OS 313 performs display based on the instruction from the print setting extension application 312, whereby the print setting screen illustrated in FIG. 9A or 9B is displayed.

Next, processing performed by the print setting extension application 312 to generate a print setting screen according to the present exemplary embodiment will be described with reference to FIG. 10. FIG. 10 illustrates details of the processing performed in step S808 of FIG. 8. Each processing illustrated in FIG. 10 is implemented by the CPU 212 executing the program of the print setting extension application 312.

In step S1000, the print setting extension application 312 starts processing when the OS 313 issues an activation request to the print setting extension application 312 based on a user's operation.

In step S1001, the print setting extension application 312 acquires print setting information and parameters, including a printer name, that are received from the OS 313 together with the activation request. The OS 313 transmits the activation request to the print setting extension application 312 when the user selects the object 942 on the print setting screen illustrated in FIG. 9C. At this time, the print setting extension application 312 acquires information about the printer name and the number of copies set on the print setting screen of FIG. 9C. The acquired information is used when the print setting screen to be displayed is selected or when the print setting extension application 312 displays the print setting screen.

In step S1002, the print setting extension application 312 determines whether the type of printer driver associated with the print queue corresponding to the selected printer information is the cloud printer driver 311. The information about the parameters received from the OS 313 together with the activation request includes information about the type of printer driver associated with the print queue corresponding to the selected printer information. For example, "device category" of the associated printer driver is included as a property attribute. If the "device category" is "PrintFax.Printer", the print setting extension application 312 determines that the type of printer driver is the local printer driver 314. If the "device category" is "PrintFax.Printer.Cloud", the print setting extension application 312 determines that the type of printer driver is the cloud printer driver 311. The determination method in step S1002 is not limited thereto. For example, the print setting extension application 312 may make the determination by using the printer driver name of the printer driver that can be acquired from the OS 313. If the information to be used for the determination in step S1002 is not successfully acquired from the OS 313 in step S1001, the print setting extension application 312 may additionally acquire a configuration of or information about the information processing apparatus on which the print setting extension application 312 runs, and make the determination. For example, the print setting extension application 312 may identify the name of the connected printer driver based on the name of the selected print queue, and make the determination.

If the print setting extension application 312 determines that the printer driver to be used in generating print data is the cloud printer driver 311 (YES in step S1002), the processing proceeds to step S1003. In step S1003, the print setting extension application 312 acquires a print setting screen for the cloud print service 321. For example, the print setting extension application 312 accesses the cloud printer print setting UI unit 36104 via the external I/F 36101 of the print setting UI service 361 in the web server 106. The present exemplary embodiment deals with an example of URL-based access. In using the cloud printer driver 311, the print setting extension application 312 accesses a URL "https://printsettingUI/cloud/model=AAA". This URL includes a parameter "cloud" indicating that print data is transmitted to the selected printer via the cloud print service 321. The URL also includes the model name "AAA" of the connected printer, as information to be used in generating the print setting UI (the print setting screen). The cloud printer print setting UI unit 36104 of the print setting UI service 361 determines the configuration of the print setting UI based on the parameter, and prepares the print setting UI to be displayed on the print setting extension application 312. More specifically, the cloud printer print setting UI unit 36104 reflects the setting values set on the print setting initial screen received from the print setting extension application 312, in the print setting UI. The cloud printer print setting UI unit 36104 also determines setting items and setting values to be displayed based on the model and configuration of the cloud print-capable printer 104, and lays out the determined setting items and setting values on the print setting UI.

The print setting UI service 361 then transmits the print setting UI for the cloud print service 321 to the print setting extension application 312.

On the other hand, if the print setting extension application 312 determines that the printer driver selected in step S1002 is not the cloud printer driver 311 (NO in step S1002), the processing proceeds to step S1004. In step S1004, the print setting extension application 312 acquires a print setting screen for local printing. The print setting extension application 312 accesses the local printer print setting UI unit 36103 via the external I/F 36101 of the print setting UI service 361 in the web server 106. The present exemplary embodiment deals with an example of URL-based access. The print setting extension application 312 accesses a URL "https://printsettingUI/local/model=AAA". This URL includes a parameter "local" for accessing the local printer print setting UI unit 36103. The URL also includes the model name "AAA" of the connected printer, as information to be used in generating the print setting UI. The local printer print setting UI unit 36103 of the print setting UI service 361 refers to the model data 36105 and determines the configuration of the print setting UI based on the received parameters. The local printer print setting UI unit 36103 then prepares the print setting UI to be displayed on the print setting extension application 312, using the determined configuration of the print setting UI. More specifically, the local printer print setting UI unit 36103 reflects the setting values set on the print setting initial screen received from the print setting extension application 312, in the print setting UI. The local printer print setting UI unit 36103 also determines setting items and setting values to be displayed based on the model and configuration of the cloud print-capable printer 104, and lays out the determined setting items and setting values on the print setting UI. The print setting UI service 361 transmits the prepared print setting UI for local printing to the print setting extension application 312.

In step S1005, the print setting extension application 312 prepares the print setting UI (the print setting screen) accordingly, and displays the print setting UI on the extension application UI unit 31202 of the print setting extension application 312. More specifically, a UI control (a web view control) enabling display of a website is arranged in the extension application UI unit 31202. The print setting extension application 312 displays the print setting screen received from the print setting UI service 361, using the arranged web view control.

Examples of the print setting screen for the cloud print service 321 and the print setting screen for local printing will be described with reference to FIGS. 9A and 9B.

FIG. 9A illustrates an example of a print setting screen 901 for local printing. The print setting screen 901 for local printing includes items for setting the size of paper, the number of copies, the orientation of the paper to be fed during printing, and which side of the paper to print on. Among these items, items already set on the print setting initial screen are displayed in a state where setting values are reflected in the items. The other items are displayed with default values set therein. If an "OK" button is selected, the display of the print setting screen 901 for local printing ends, and the print setting initial screen is displayed.

FIG. 9B illustrates a print setting screen 911 for the cloud print service 321 (cloud printing). On the print setting screen 911 for the cloud print service 321, stapling and punching settings can be made in addition to the items settable on the print setting screen 901 for local printing. On the print setting screen 911 for the cloud print service 321, items settable on the print setting initial screen are displayed in a state where setting values set on the print setting initial screen are reflected in the items. Meanwhile, items not settable on the print setting initial screen are displayed with default setting values set therein. In FIG. 9A, setting items for stapling and punching displayed in FIG. 9B are not displayed. Alternatively, in FIG. 9A, print setting items and setting values displayed on the print setting screen 911 for cloud printing, such as those for punching and stapling, may be displayed and grayed out to prevent these items from being changed by a user's operation.

Cloud printing enables print management and is thus expected to be used frequently in business. By contrast, local printing is easily usable at home and thus expected to be used frequently by consumers. The print setting screen 911 for cloud printing frequently used in business is thus displayed to accommodate sophisticated functions. For example, the print setting screen 911 is displayed assuming that the finishers for stapling and punching are attached. On the other hand, the print setting screen 901 for local printing is displayed to enable simple setting of basic functions. For such a reason, in the present exemplary embodiment, the print setting screen 911 for the cloud print service 321 is described to be displayed with more setting items than those of the print setting screen 901 for local printing. However, the settable setting items or setting values can be changed depending on whether to submit print data via the cloud print service 321 when the cloud print-capable printer 104 prints the print data. For example, the print setting screen 911 for the cloud print service 321 may hide a setting item for personal identification number (PIN) code printing (hereinafter also referred to as PIN printing), whereas the print setting screen 901 for local printing may display the setting item for the PIN code printing. The PIN code printing refers to the function of setting a password for print data, holding the print data until the user inputs the password from the operation unit of the printer main body, and starting to print the print data when the PIN code (the password) is input. The cloud print service 321 manages print data on a user-by-user basis. The cloud print service 321 can thus provide the function of holding print data until the user logs in to the cloud print-capable printer 104 and gives an instruction about the print data to be printed, transmitting the print data to the cloud print-capable printer 104 based on the user's instruction, and printing the print data. In such a case, if a PIN code is set, the user is to perform both the login to the cloud print-capable printer 104 and the input of the PIN code. The print setting screen 911 for the cloud print service 321 thus hides the setting item for the PIN code printing. By contrast, in the case of local printing, print data can be immediately printed without being held, and the setting item for the PIN code printing is thus displayed. This makes it possible to control the PIN code printing function to be disabled in using the cloud print service 321, and to be enabled as appropriate in the case of local printing.

In step S1006, the user completes the print setting operation. The print setting extension application 312 acquires information about the print settings set by the user, from the local printer print setting UI unit 36103 or the cloud printer print setting UI unit 36104. In step S1007, the print setting extension application 312 returns the information acquired from the print setting UI service 361 to the OS 313. In step S1008, the processing ends.

In the present exemplary embodiment, as illustrated in FIG. 10, whether to display the print setting screen 901 for local printing or the print setting screen 911 for the cloud print service 321 is switched by changing the URL when the print setting extension application 312 accesses the print setting UI service 361.

The method for switching the print setting screen is not limited thereto. For example, the print setting extension application 312 transmits the information about the printer driver associated with the print queue corresponding to the printer information selected in the area 941, to the print setting UI service 361 based on the selection of the object 942 in FIG. 9C. The control unit 36102 of the print setting UI service 361 determines whether the printer driver to be used in generating print data is the local printer driver 314 or the cloud printer driver 311, based on the received information about the printer driver. The control unit 36102 accesses the local printer print setting UI unit 36103 or the cloud printer print setting UI unit 36104 based on the determination result, and generates a print setting screen. The control unit 36102 then transmits the generated print setting screen to the print setting extension application 312. In such a manner, the print setting screen 901 for local printing or the print setting screen 911 for cloud printing can be displayed without changing the URL to be accessed by the print setting extension application 312.

Processing performed by the client terminal 101, the cloud print service 321, and the cloud print-capable printer 104 during printing will be described with reference to FIGS. 12A to 12C.

FIG. 12A illustrates the processing performed by the client terminal 101. The processing illustrated in FIG. 12A is implemented by the CPU 212 implementing the software blocks of the client terminal 101.

In step S1201, the OS 313 determines whether a print button is selected. If the object 940 on the print setting screen illustrated in FIG. 9C is selected, the OS 313 determines that the print button is selected. If the print button is not selected (NO in step S1201), the processing returns to step S1201. If the print button is selected (YES in step S1201), the processing proceeds to step S1202.

In step S1202, the OS 313 acquires information about the printer driver associated with the print queue for transmitting print data to the printer selected in the area 941 of FIG. 9C.

The information about the printer driver acquired at this time includes type information and name information about the printer driver.

In step S1203, the OS 313 determines whether the printer driver is the cloud printer driver 311, based on the information about the printer driver acquired in step S1202. If the printer driver is determined to be the cloud printer driver 311 (YES in step S1203), the processing proceeds to step S1204. If the printer driver is not determined to be the cloud printer driver 311 (NO in step S1203), the processing proceeds to step S1206.

In step S1204, the OS 313 operates the cloud printer driver 311 to generate print data. The print data generated at this time is print data of Extensible Markup Language (XML) Paper Specification (XPS) format, for example. In step S1205, the OS 313 transmits the print data generated by the cloud printer driver 311 to the cloud print service 321.

If the printer driver is not the cloud printer driver 311, the processing proceeds to step S1206. In step S1206, the OS 313 generates print data using the local printer driver 314. Similarly to the print data generated in step S1204, the print data generated at this time is data of XPS format, for example.

While print data is described to be generated as data of XPS format in steps S1204 and S1206, the data format is not limited thereto. For example, the local printer driver 314 or the cloud printer driver 311 may generate image data in Portable Document Format (PDF) format or in a raster format, and generate print data including the image data. The generated print data is transmitted to the cloud print-capable printer 104 or the cloud print service 321.

In step S1207, the OS 313 transmits the generated print data to the cloud print-capable printer 104. The print data is transmitted to the cloud print-capable printer 104 without going through the cloud print service 321.

FIG. 12B is a flowchart illustrating the processing performed by the cloud print service 321. The processing illustrated in FIG. 12B is implemented by a CPU 222 of the cloud print server 102 executing the functions represented by the software blocks in FIG. 3B.

In step S1301, the print queue management unit 32104 determines whether print data is received from the client terminal 101. If no print data is received (NO in step S1301), the processing returns to S1301 and the print management unit 32103 continues to wait for print data. If print data is received (YES in step S1301), the processing proceeds to step S1302.

In step S1302, the print queue management unit 32104 registers the received print data in the print queue of the printer that is a transmission destination of the print data. The print queue management unit 32104 identifies the print queue based on the information about the print queue specified by the received print data, and registers the print data in the identified print queue.

In step S1303, the print management unit 32103 determines whether a print data acquisition request is received from the cloud print-capable printer 104. If the print data acquisition request is received (YES in step S1303), the processing proceeds to step S1304. In step S1304, the print management unit 32103 transmits the print data registered in the print queue for the cloud print-capable printer 104 to the cloud print-capable printer 104. If no print data acquisition request is received (NO in step S1303), the processing returns to step S1303.

In step S1305, the print management unit 32103 determines whether a printing completion notification is received from the cloud print-capable printer 104. If the printing completion notification is received (YES in step S1305), the processing proceeds to step S1306. In step S1306, the print management unit 32103 deletes the print data registered in the print queue. The processing illustrated in the flowchart then ends. If no printing completion notification is received (NO in step S1305), the processing returns to step S1305.

The above is the description of the processing performed by the cloud print service 321.

The processing performed by the cloud print-capable printer 104 will be described with reference to FIG. 12C. The processing illustrated in FIG. 12C is implemented by the CPU 242 of the cloud print-capable printer 104 executing the functions of the software blocks illustrated in FIG. 3D.

In step S1401, the print data reception unit 34101 determines whether print data is received. If print data is received (YES in step S1401), the processing proceeds to step S1404. In step S1404, the print output unit 34103 performs print processing based on the received print data.

If no print data is received (NO in step S1401), the processing proceeds to step S1402. In step S1402, the UI operation unit 34104 determines whether a user's operation for acquiring print data from the cloud print service 321 is performed. The user's operation for acquiring print data from the cloud print service 321 is an operation to log in to the cloud print service 321, for example. The user's operation also includes an operation to display a print data list after the login to the cloud print service 321, select print data to be output from the displayed print data list, and give an instruction to print the print data. If the user's operation is performed (YES in step S1402), the processing proceeds to step S1403. If the user's operation is not performed (NO in step S1402), the processing illustrated in FIG. 12C ends.

In step S1403, the cloud print service I/F 34105 accesses the cloud print service 321, transmits a print data acquisition request, and receives the print data. The processing then proceeds to step S1404.

In step S1405, after the completion of the printing, the print data reception unit 34101 determines whether the print data used in the print processing is the print data received from the cloud print service 321. If the print data used in the print processing is the print data received from the cloud print service 321 (YES in step S1405), the processing proceeds to step S1406. In step S1406, the cloud print service I/F 34105 transmits a printing completion notification to the cloud print service 321. If the print data used in the print processing is not the print data delivered via the cloud print service 321, i.e., if the print data used in the print processing is the print data received from the client terminal 101 (NO in step S1405), the processing illustrated in FIG. 12C ends.

The above is the description of the flowchart up to the execution of the print processing by the cloud print-capable printer 104 based on the print data generated by the cloud printer driver 311 or the local printer driver 314.

As described above, the print setting extension application 312 makes a determination about the connected printer driver, whereby an appropriate print setting UI corresponding to the submission path of print data can be displayed. In the present exemplary embodiment, the single print setting extension application 312 is described to be associated with one image forming apparatus having a plurality of print paths. Alternatively, a plurality of the print setting extension applications 312 may be associated respectively with the plurality of print paths. Using the method according to the present exemplary embodiment enables commonality of the processing of the print setting extension application 312 and provides similar effects.

In the present exemplary embodiment, the print setting UI to be displayed is switched based on the type of printer driver with which the print setting extension application 312 is associated. Alternatively, the print setting UI may be switched based on other determination criteria. For example, in a system where printing is performed without using a printer driver, a component having a mechanism for submitting jobs to the cloud print service 321 can change print settings to be called, based on the type of printer connected.

In the first exemplary embodiment, the print setting extension application 312 changes the settable items between when the local printer driver 314 is used and when the cloud printer driver 311 is used, by referring to the type of the associated printer driver in displaying a print setting screen, and controlling the setting items to be displayed.

In a second exemplary embodiment, the cloud print-capable printer 104 controls print settings differently between when the local printer driver 314 is used and when the cloud printer driver 311 is used. More specifically, the cloud print-capable printer 104 changes print setting items to be displayed, by changing the information to be transmitted in step S607 of FIG. 6 and the printer information to be transmitted to the client terminal 101 in step S1106 of FIG. 11.

In the present exemplary embodiment, if the print setting extension application 312 is activated by the cloud printer driver 311, a print setting screen that enables punching and stapling settings and disables a PIN print setting is displayed as illustrated in FIG. 13B. On the other hand, if the print setting extension application 312 is activated by the local printer driver 314, a print setting screen that disables the punching and stapling settings and enables the PIN print setting is displayed as illustrated in FIG. 13A.

A system configuration, a hardware configuration, and a software configuration according to the present exemplary embodiment are similar to those illustrated in FIGS. 1 to 3F. However, the web server 106 is not used in the present exemplary embodiment. Similarly to the first exemplary embodiment, the print setting extension application 312 and the extended setup information file are registered using the method illustrated in FIG. 4.

A sequence of processing for registering the cloud print-capable printer 104 in the cloud print service 321 is similar to that illustrated in FIG. 6. A description thereof will thus be given with reference to FIG. 6.

In step S607 of FIG. 6, the cloud print-capable printer 104 transmits printer information to the cloud print service 321. The cloud print-capable printer 104 holds printer information for the cloud print service 321 and printer information for local printing.

The printer information for the cloud print service 321 includes capability information about the punching and stapling functions and does not include capability information about the PIN printing. By contrast, the printer information for local printing does not include the capability information about the punching and stapling functions and includes the capability information about the PIN printing.

In step S607, the cloud print-capable printer 104 transmits the printer information for the cloud print service 321 to the cloud print service 321.

The processing illustrated in FIG. 8 is then performed to generate, in the client terminal 101, a print queue for transmitting print data to the cloud print-capable printer 104 via the cloud print service 321. The printer information acquired from the cloud print service 321 in step S708 of FIG. 7 is the printer information transmitted from the cloud print-capable printer 104 to the cloud print service 321 in the processing of step S607 in FIG. 6 according to the present exemplary embodiment. The printer information associated with the print queue generated in the client terminal 101 thus includes the capability information about the punching and stapling functions and does not include the capability information about the PIN printing.

Figure 11:
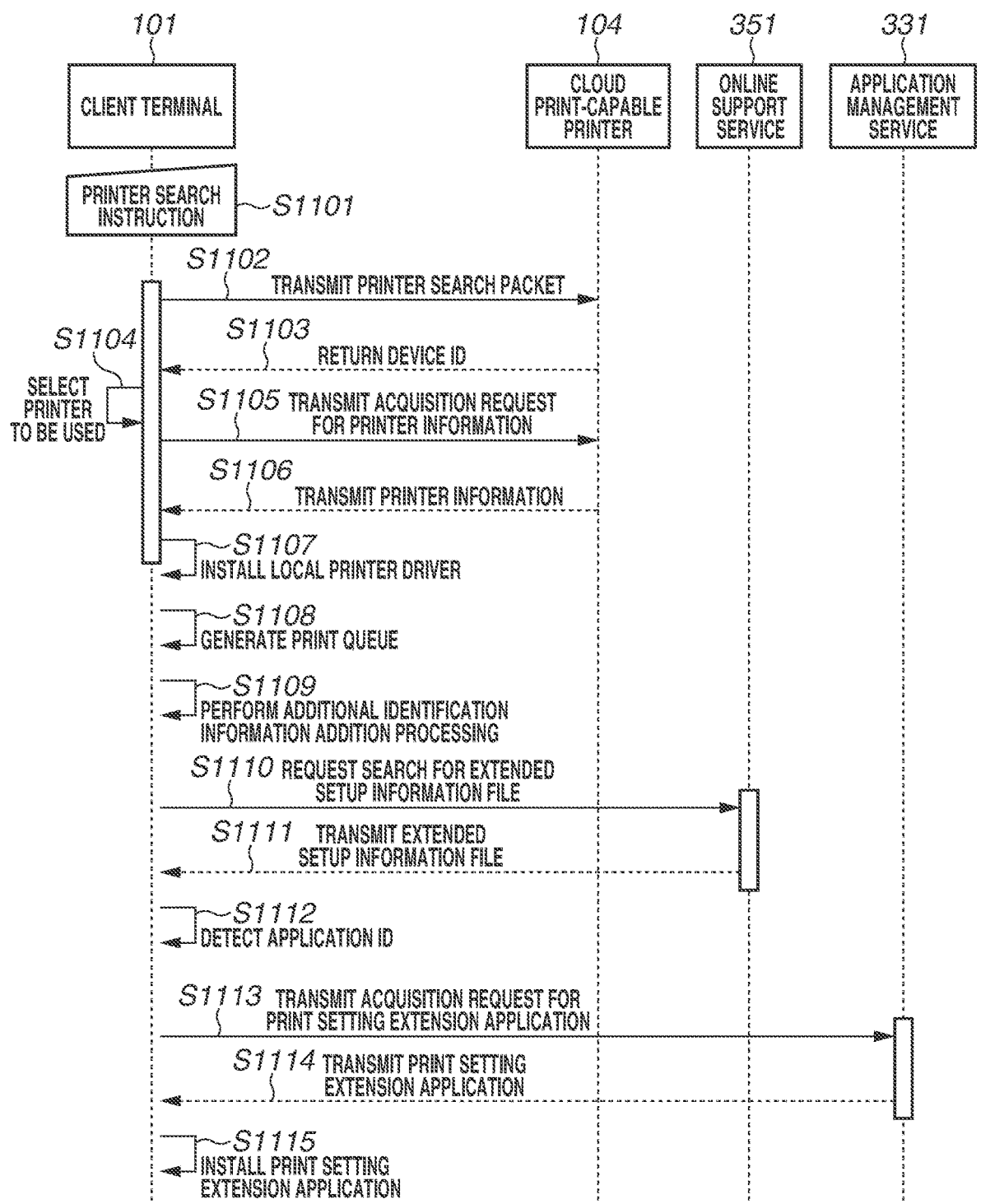
FIG. 11 is a diagram illustrating an example of a sequence between pieces of software, the cloud print-capable printer, and services related to generation of a print queue of a local printer driver according to the first exemplary embodiment.

If the local printer driver 314 is used in the present exemplary embodiment, the printer information for local printing is transmitted to the client terminal 101 in step S1106 of the sequence illustrated in FIG. 11. The client terminal 101 sets the received printer information for local printing in the print queue associated with the local printer driver 314.

To display a print setting screen, the print setting extension application 312 uses the printer information associated with the print queue. Since the printer information associated with the print queue for cloud printing and the printer information associated with the print queue for local printing are different from each other, the setting items that can be set on the print setting screen displayed by the print setting extension application 312 vary.

FIG. 14 is a flowchart illustrating processing performed by the cloud print-capable printer 104 when receiving a printer information acquisition request according to the present exemplary embodiment. The processing illustrated in FIG. 14 is implemented by the CPU 242 of the cloud print-capable printer 104 loading a program stored in the storage unit 244 into the memory 243 and executing the program.

In step S2001, the CPU 242 determines whether the printer information acquisition request is transmitted from the cloud print service 321. For example, the determination in step S2001 is made based on an Internet Protocol (IP) address included in the acquisition request. Aside from the IP address, a flag indicating whether the acquisition request is transmitted from the cloud print service 321 may be set in the acquisition request, and the determination may be made based on the flag.

If the printer information acquisition request is transmitted from the cloud print service 321 (YES in step S2001), the processing proceeds to step S2002. In step S2002, the CPU 242 transmits the printer information for cloud printing to the cloud print service 321. The printer information registered in the cloud print service 321 is transmitted to the client terminal 101 in step S708 of FIG. 7, and stored in the client terminal 101 in association with the print queue.

On the other hand, if the printer information acquisition request is not transmitted from the cloud print service 321 (NO in step S2001), the processing proceeds to step S2003. In step S2003, the CPU 242 transmits the printer information for local printing to the client terminal 101. The client terminal 101 stores the acquired printer information in association with the print queue for local printing.

As described above, the cloud print-capable printer 104 changes the printer information based on where the printer information acquisition request is transmitted from. This makes it possible to change the printer information to be associated with a print queue when the client terminal 101 generates the print queue.

FIG. 15 is a flowchart illustrating processing for making print settings using the print setting extension application 312 installed on the client terminal 101. This processing is implemented by the CPU 212 executing the program of the print setting extension application 312 stored in the storage unit 214 of the client terminal 101.

In step S2101, the CPU 212 acquires the printer information associated with the selected print queue. The printer information acquired at this time varies depending on whether the print queue is for the cloud print service 321 or for local printing.

In step S2102, the CPU 212 generates a print setting screen based on the acquired printer information, and displays the generated print setting screen. Since the printer information acquired in step S2101 varies, a different print setting screen, such as the print setting screen 901 illustrated in FIG. 13A or the print setting screen 911 illustrated in FIG. 13B, is displayed depending on the selected print queue.

In step S2103, the CPU 212 accepts a print setting operation. In step S2104, the CPU 212 notifies the OS 313 of the client terminal 101 about the print setting information set by the user. Processing for generating print data and transmitting the print data to the cloud print-capable printer 104 after step S2104 is similar to that in the first exemplary embodiment. A description thereof will thus be omitted.

In such a manner, different print setting screens having different setting items can be displayed without using the web server 106, depending on whether the cloud print service 321 is used.

In the first exemplary embodiment, the setting items to be displayed are described to be changed using the web server 106. In the second exemplary embodiment, the system is described to change the setting items to be displayed, by changing the printer information provided by the cloud print-capable printer 104.

In a third exemplary embodiment, a system that changes the setting items to be displayed, without using the web server 106, depending on whether the print queue is associated with the cloud printer driver 311 even if the printer information is fixed will be described. In the present exemplary embodiment, the print setting screen 901 of FIG. 13A is displayed if the print queue associated with the local printer driver 314 is selected. The print setting screen 911 of FIG. 13B is displayed if the print queue associated with the cloud printer driver 311 is selected.

Figure 16:
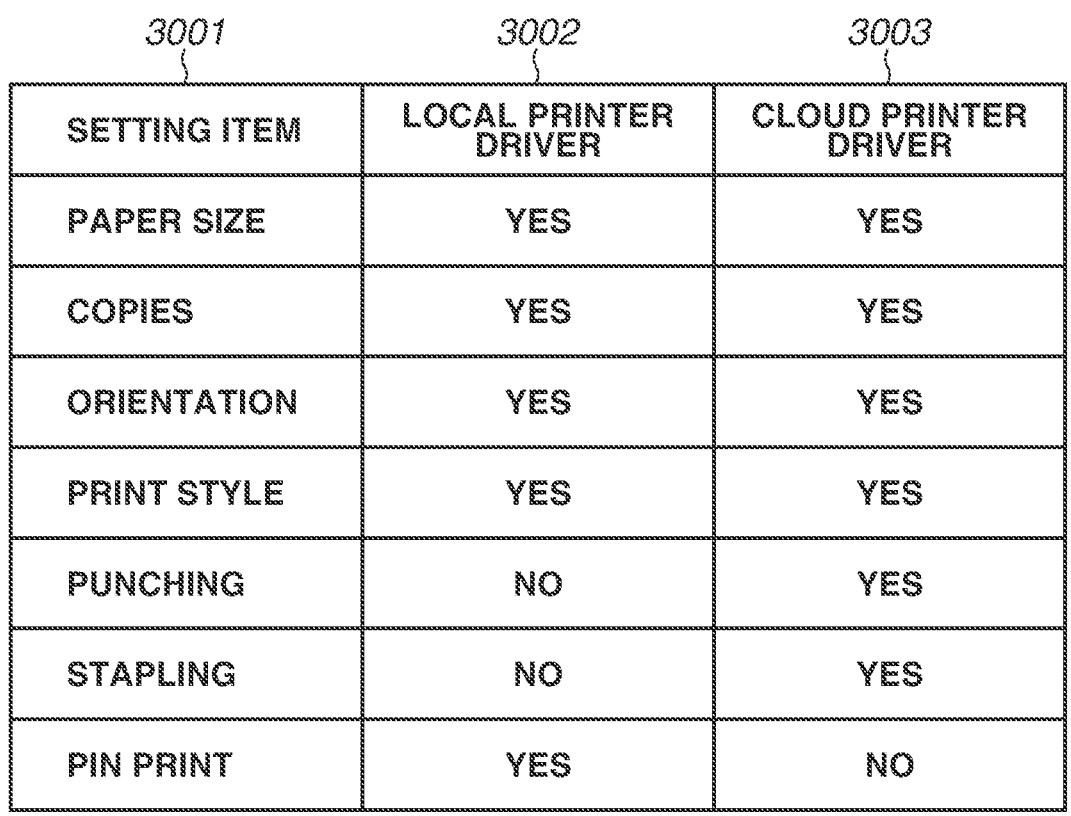
FIG. 16 is a diagram illustrating an example of a table stored by a print setting extension application according to a third exemplary embodiment.

In the present exemplary embodiment, the print setting extension application 312 stores a table for managing, for each of the printer drivers, the setting items to be displayed on a print setting screen. FIG. 16 illustrates an example of the table stored by the print setting extension application 312 according to the present exemplary embodiment. A column 3001 indicates the setting items to be displayed on a print setting screen by the print setting extension application 312. A column 3002 indicates whether to display the setting items on the print setting screen if the print queue associated with the local printer driver 314 is selected. "YES" indicates that the setting item is to be displayed. "NO" indicates that the setting item is not to be displayed. A column 3003 indicates whether to display the setting items on the print setting screen if the print queue associated with the cloud printer driver 311 is selected.

Configurations and sequences of the system are similar to those illustrated in FIGS. 1 to 7 according to the first exemplary embodiment, except that the web server 106 is not used. In the present exemplary embodiment, the printer information transmitted to the cloud print service 321 in step S607 of FIG. 6 and transmitted to the client terminal 101 in step S708 of FIG. 7 is the same as the printer information transmitted in step S1106 of FIG. 11.

Figure 17:
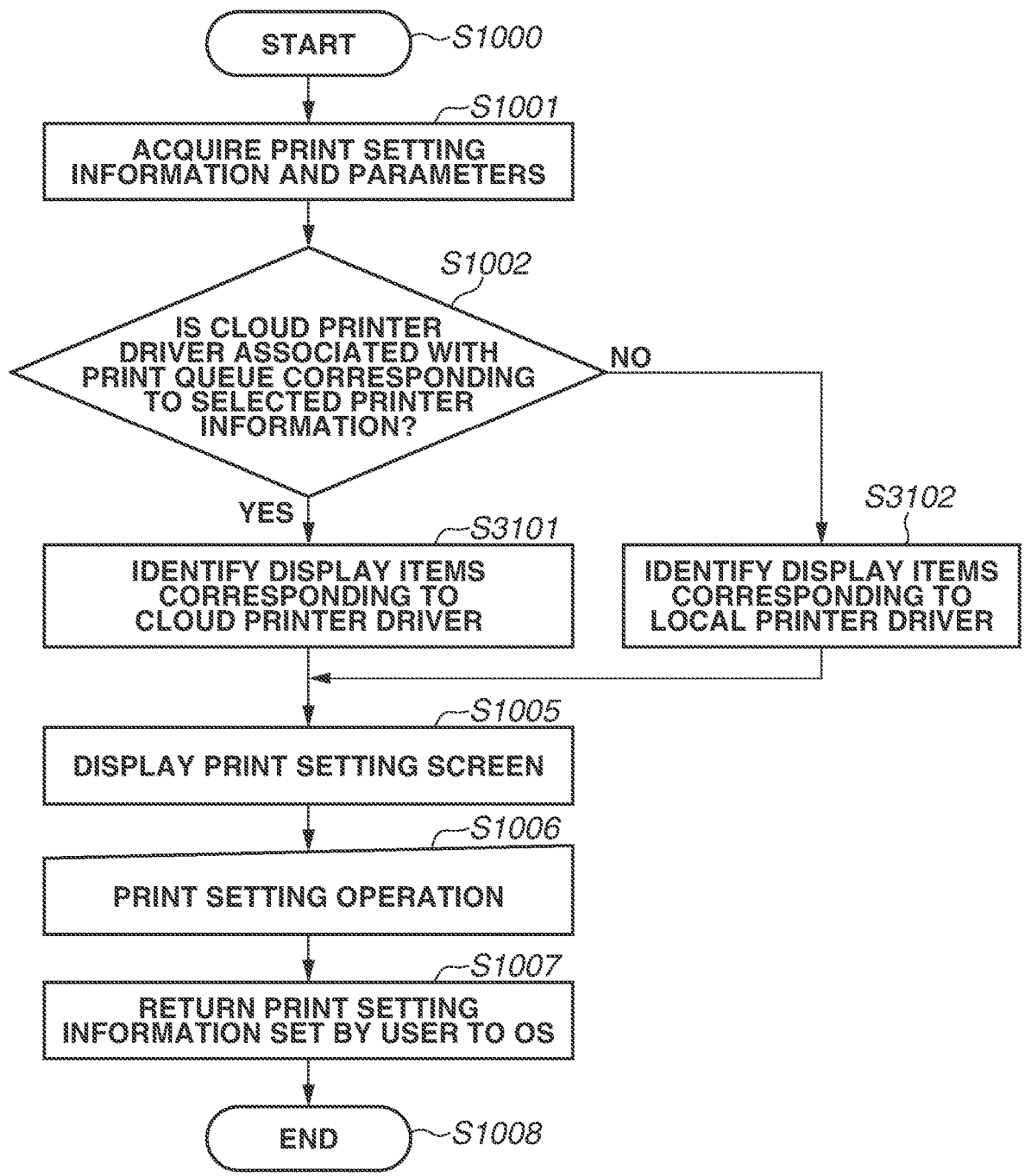
FIG. 17 is a flowchart illustrating processing performed when the print setting extension application displays a UI according to the third exemplary embodiment.

FIG. 17 is a flowchart illustrating processing performed by the print setting extension application 312 to display a print setting screen. Steps similar to those of FIG. 10 according to the first exemplary embodiment are designated by the same step numbers. Differences from the first exemplary embodiment will be described.

The processing illustrated in FIG. 17 is implemented by the CPU 212 of the client terminal 101 executing the program of the print setting extension application 312.

If the print queue associated with the cloud printer driver 311 is selected (YES in step S1002), the processing proceeds to step S3101. In step S3101, the CPU 212 identifies the setting items corresponding to the cloud printer driver 311 in the table illustrated in FIG. 16. The CPU 212 further acquires the capability information about the identified setting items from the printer information. On the other hand, if the print queue associated with the local printer driver 314 is selected (NO in step S1002), the processing proceeds to step S3102. In step S3102, the CPU 212 identifies the setting items corresponding to the local printer driver 314 in the table illustrated in FIG. 16. The CPU 212 acquires the capability information about the identified setting items from the printer information. In step S1005, the CPU 212 generates a print setting screen based on the acquired capability information, and displays the generated print setting screen. Processing after step S1005 is similar to that in the first exemplary embodiment.

In such a manner, the setting items to be displayed on the print setting screen can be changed depending on the printer driver to be used, without using the web server 106. Even if the printer information provided by the cloud print-capable printer 104 is fixed, the setting items to be displayed on the print setting screen can be changed depending on the printer driver to be used.

In the present exemplary embodiment, the same print setting extension application 312 is described to be installed onto image forming apparatuses having the same identification information regardless of the presence or absence of the intervention of the cloud print service 321. Alternatively, different print setting extension applications 312 may be installed depending on the presence or absence of the intervention of the cloud print service 321. In such a case, different print setting screens with different settable items as illustrated in FIGS. 9A and 9B may be displayed by making the setting items settable by the print setting extension applications 312 different.

An exemplary embodiment of the disclosure can also be implemented by performing the following processing. The processing includes supplying software (a computer program) for implementing the functions according to the foregoing exemplary embodiments to a system or an apparatus via a network or various storage media, and causing a computer (or a CPU or a microprocessing unit (MPU)) in the system or the apparatus to read and execute the program code (the computer program). In such a case, the computer program and a storage medium storing the computer program are included in the exemplary embodiments of the disclosure.

The information processing apparatus according to any of the above-described exemplary embodiments makes it possible to change the print setting screen to be provided, depending on the submission path of print data even if the identification information about the image forming apparatus used for printing is the same.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-112140, filed Jul. 6, 2021 and Japanese Patent Application No. 2022-070534, filed Apr. 22, 2022, each of which is hereby incorporated by reference herein in its entirety.

What is claimed is:

1. An information processing apparatus storing a first printer driver configured to generate first print data and transmit the first print data to an image forming apparatus according to a predetermined protocol not via a server system, a second printer driver configured to generate second print data and transmit the second print data to the image forming apparatus according to the predetermined protocol via the server system having a cloud print service, and a print setting application, the information processing apparatus comprising:

a storage device configured to store a first print queue for transmitting the first print data to the image forming apparatus and a second print queue for transmitting the second print data to the image forming apparatus via the server system;

a display device;

one or more processors; and at least one memory coupled to the one or more processors storing instructions that, when executed by the one or more processors, cause the one or more processors configured to cause:

the display device to display a first print setting screen provided by the print setting application, in a case where the first print queue corresponding to the first printer driver is selected; and the display device to display a second print setting screen provided by the print setting application, in a case where the second print queue corresponding to the second printer driver is selected, the second print setting screen not including a setting object for setting a predetermined setting item that is settable in the first print setting screen, wherein the first printer driver includes a first interface for processing an exchange of data between the first printer driver and the print setting application, and wherein the second printer driver includes a second interface for processing an exchange of data between the second printer driver and the print setting application, wherein the print setting application processes print data generated by the first printer driver in a case where the first print queue is selected, wherein the print setting application processes print data generated by the second printer driver in a case where the second print queue is selected, and wherein the information processing apparatus is further configured to install the print setting application by:

transmitting, to the image forming apparatus, a first request for a device identification information of the image forming apparatus, receiving, from the image forming apparatus, the device identification information, generating the first print queue to transmit the print data to the image forming apparatus, transmitting to an online support service, a request for an extended setup information file corresponding to the image forming apparatus, installing the print setting application, identified based on the received extended setup file, in association with the first print queue, and wherein the information processing apparatus is further configured to install the print setting application by:

transmitting, to the cloud print service, a request for a list of image forming apparatuses registered in the cloud print service, receiving, from the cloud print service, the list of the image forming apparatuses, displaying, on the display device, the list of image forming apparatuses, transmitting, to the cloud print service, a request for device information corresponding to the image forming apparatus selected from among the list of image forming apparatuses displayed on the display device, generating the second print queue to transmit the print data to the image forming apparatus via the cloud print service, transmitting, based on the received device information, to an online support service, a request for an extended setup information file, and installing the received print setting application, identified based on the received extended setup file, in association with the second print queue.

2. The information processing apparatus according to claim 1, wherein the one or more processors are further configured to transmit:

the first print data to the image forming apparatus according to the predetermined protocol, and the second print data to the server system according to the predetermined protocol.

3. The information processing apparatus according to claim 1, wherein the predetermined protocol is an Internet Printing Protocol.

4. The information processing apparatus according to claim 1, wherein the one or more processors are further configured to:

select one of a plurality of print queues including the first print queue and the second print queue, based on a user's operation.

5. The information processing apparatus according to claim 4, wherein the one or more processors are further configured to:

acquire screen information corresponding to the first print setting screen or the second print setting screen from another server system.

6. The information processing apparatus according to claim 5, wherein the one or more processors are further configured to:

acquire first screen information corresponding to the first print setting screen in a case where the first print queue is selected and acquire second screen information corresponding to the second print setting screen in a case where the second print queue is selected.

7. The information processing apparatus according to claim 6, wherein the first screen information is Uniform Resource Locator (URL) corresponding to the first printer driver and the second screen information is URL corresponding to the second printer driver.

8. The information processing apparatus according to claim 1, wherein the predetermined setting item is an item regarding PIN printing.

9. A non-volatile computer-readable storage medium storing a print setting application that causes an information processing apparatus storing a first printer driver configured to generate first print data and transmit the first print data to an image forming apparatus according to a predetermined protocol not via a server system and a second printer driver configured to generate second print data and transmit the second print data to the image forming apparatus according to the predetermined protocol via the server system having a cloud print service to perform a control method comprising:

causing a display device to display a first print setting screen provided by the print setting application, in a case where a first print queue for transmitting the first print data to the image forming apparatus is selected;

causing the display device to display a second print setting screen provided by the print setting application, in a case where a second print queue for transmitting the second print data to the image forming apparatus via the sever system is selected, the second print setting screen not including a setting object for setting a predetermined setting item that is settable in the first print setting screen, wherein the first printer driver includes a first interface for processing an exchange of data between the first printer driver and the print setting application, and wherein the second printer driver includes a second interface for processing an exchange of data between the second printer driver and the print setting application;

processing print data generated by the first printer driver in a case where the first print queue is selected;

processing print data generated by the second printer driver in a case where the second print queue is selected, wherein the information processing apparatus is further configured to install the print setting application by:

transmitting, to the image forming apparatus, a first request for a device identification information of the image forming apparatus, receiving, from the image forming apparatus, the device identification information, generating the first print queue to transmit the print data to the image forming apparatus, transmitting to an online support service, a request for an extended setup information file corresponding to the image forming apparatus, installing the print setting application, identified based on the received extended setup file, in association with the first print queue, and wherein the information processing apparatus is further configured to install the print setting application by:

transmitting, to the cloud print service, a request for a list of image forming apparatuses registered in the cloud print service, receiving, from the cloud print service, the list of the image forming apparatuses, displaying, on the display device, the list of image forming apparatuses, transmitting, to the cloud print service, a request for device information corresponding to the image forming apparatus selected from among the list of image forming apparatuses displayed on the display device, generating the second print queue to transmit the print data to the image forming apparatus via the cloud print service, transmitting, based on the received device information, to an online support service, a request for an extended setup information file, and installing the received print setting application, identified based on the received extended setup file, in association with the second print queue.

10. The non-volatile computer-readable storage medium according to claim 9, wherein the control method is further comprising:

acquiring first information corresponding to the first print setting screen by accessing first Uniform Resource Locator (URL) in a case where the first print queue is selected; and acquiring second information corresponding to the second print setting screen by accessing second URL in a case where the second print queue is selected.

11. The non-volatile computer-readable storage medium according to claim 9, wherein the predetermined setting item is an item regarding PIN printing.

12. The non-volatile computer-readable storage medium according to claim 9, wherein the first printer driver generates the first print data that a plurality of printers of a plurality of printer vendors are able to interpret and the second printer driver generates the second print data that a plurality of printers of a plurality of printer vendors are able to interpret.

13. The non-volatile computer-readable storage medium according to claim 9, wherein at least one of the first printer driver and the second printer driver is provided by a vendor of an operating system of the information processing apparatus.

14. The non-volatile computer-readable storage medium according to claim 9, wherein the print setting application is identified based on identification information corresponding to the image forming apparatus.

15. A method for controlling an information processing apparatus storing a first printer driver configured to generate first print data and transmit the first print data to an image forming apparatus according to a predetermined protocol not via a server system and a second printer driver configured to generate second print data and transmit the second print data to the image forming apparatus according to the predetermined protocol via the server system having a cloud print service, the control method being performed based on execution of a print setting application, the method comprising:

causing a display device to display a first print setting screen provided by the print setting application, in a case where a first print queue for transmitting the first print data to the image forming apparatus is selected; and causing the display device to display a second print setting screen provided by the print setting application, in a case where a second print queue for transmitting the second print data to the image forming apparatus via the sever system is selected, the second print setting screen not including a setting object for setting a predetermined setting item that is settable in the first print setting screen, wherein the first printer driver includes a first interface for processing an exchange of data between the first printer driver and the print setting application, and wherein the second printer driver includes a second interface for processing an exchange of data between the second printer driver and the print setting application;

processing print data generated by the first printer driver in a case where the first print queue is selected;

processing print data generated by the second printer driver in a case where the second print queue is selected, and wherein the method further comprises installing the print setting application, the installing the print setting application include:

transmitting, to the image forming apparatus, a first request for a device identification information of the image forming apparatus, receiving, from the image forming apparatus, the device identification information, generating the first print queue to transmit the print data to the image forming apparatus, transmitting to an online support service, a request for an extended setup information file corresponding to the image forming apparatus, installing the print setting application, identified based on the received extended setup file, in association with the first print queue, and transmitting, to the cloud print service, a request for a list of image forming apparatuses registered in the cloud print service, receiving, from the cloud print service, the list of the image forming apparatuses, displaying, on the display device, the list of image forming apparatuses, transmitting, to the cloud print service, a request for device information corresponding to the image forming apparatus selected from among the list of image forming apparatuses displayed on the display device, generating the second print queue to transmit the print data to the image forming apparatus via the cloud print service, transmitting, based on the received device information, to an online support service, a request for an extended setup information file, and installing the received print setting application, identified based on the received extended setup file, in association with the second print queue.

16. The method according to claim 15, wherein the predetermined protocol is an Internet Printing Protocol.

17. The method according to claim 15, further comprising:

acquiring screen information corresponding to the first print setting screen or the second print setting screen from another server system.

18. The method according to claim 15, wherein the first print setting screen is displayed based on accepting a predetermined user operation in a state where the first print queue is selected, and the second print setting screen is displayed based on accepting the predetermined user operation in a state where the second print queue is selected.

19. The control method according to claim 15, wherein the predetermined setting item is an item regarding PIN printing.

20. The control method according to claim 15, wherein the first printer driver generates the first print data that a plurality of printers of a plurality of printer vendors are able to interpret and the second printer driver generates the second print data that a plurality of printers of a plurality of printer vendors are able to interpret.

21. The control method according to claim 15, wherein at least one of the first printer driver and the second printer driver is provided by a vendor of an operating system of the information processing apparatus.

22. The control method according to claim 15, wherein the print setting application is identified based on identification information corresponding to the image forming apparatus.

* * * * *